United States Patent
Xu et al.

(10) Patent No.: US 10,778,470 B2
(45) Date of Patent: Sep. 15, 2020

(54) PACKET PROCESSING METHOD, APPARATUS, AND SYSTEM

(71) Applicant: Huawei Technologies Co., Ltd., Shenzhen (CN)

(72) Inventors: Yixu Xu, Shanghai (CN); Han Zhou, Shanghai (CN); Zhongping Chen, Shanghai (CN); Yuan Xia, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 17 days.

(21) Appl. No.: 15/971,979

(22) Filed: May 4, 2018

(65) Prior Publication Data

US 2018/0254921 A1 Sep. 6, 2018

Related U.S. Application Data

(63) Continuation of application No. PCT/CN2015/093853, filed on Nov. 5, 2015.

(51) Int. Cl.
*H04L 12/66* (2006.01)
*H04L 29/06* (2006.01)
(Continued)

(52) U.S. Cl.
CPC .............. *H04L 12/66* (2013.01); *H04L 29/06* (2013.01); *H04L 41/0893* (2013.01);
(Continued)

(58) Field of Classification Search
CPC ..... H04L 12/66; H04L 29/06; H04L 41/0893; H04L 69/22
See application file for complete search history.

(56) References Cited

U.S. PATENT DOCUMENTS 8,331,229 B1 * 12/2012 Hu .................. H04L 47/805
370/230
9,407,557 B2 * 8/2016 Wadkins ............... H04L 69/163
(Continued)

FOREIGN PATENT DOCUMENTS

CN 101146053 A 3/2008
CN 101599895 A 12/2009
(Continued)

OTHER PUBLICATIONS

"Enhancements for the FPI solution," 3GPP Draft SA WG2 Meeting #104, S2-142416, Dublin, Ireland, XP050836853, pp. 1-9, 3rd Generation Partnership Project—Valbonne, France (Jul. 7, 2014-Jul. 11, 2014).

*Primary Examiner* — Hassan Kizou
*Assistant Examiner* — Deepa Belur
(74) *Attorney, Agent, or Firm* — Leydig, Voit & Mayer, Ltd.

(57) ABSTRACT

A packet processing method, apparatus, and system are provided. A policy library is deployed on a gateway control device in a centralized manner, and packet identification and policy execution are deployed on each gateway forwarding device. The solution includes: receiving, by a gateway control device, packet characteristic information that is of a first packet and that is sent by a gateway forwarding device, where the packet characteristic information is obtained after the gateway forwarding device performs packet inspection on the first packet; searching, by the gateway control device according to the packet characteristic information of the first packet, a prestored policy library for a first processing policy corresponding to the packet characteristic information; and sending, by the gateway control device, the first processing policy to the gateway forwarding device, so that the gateway
(Continued)

forwarding device executes a packet processing action in the first processing policy.

17 Claims, 14 Drawing Sheets

(51) Int. Cl.
    *H04L 12/851*    (2013.01)
    *H04L 12/24*    (2006.01)
    *H04L 12/26*    (2006.01)
    *H04L 12/741*    (2013.01)
    *H04W 88/16*    (2009.01)

(52) U.S. Cl.
    CPC ............ *H04L 43/028* (2013.01); *H04L 45/74* (2013.01); *H04L 47/2483* (2013.01); *H04L 69/22* (2013.01); *H04W 88/16* (2013.01)

(56) References Cited

U.S. PATENT DOCUMENTS

| | | | |
|---|---|---|---|
| 10,264,003 B1* | 4/2019 | Wu | H04L 43/08 |
| 2006/0136987 A1* | 6/2006 | Okuda | H04L 63/0227 726/1 |
| 2007/0058543 A1 | 3/2007 | Fenart et al. | |
| 2007/0121615 A1* | 5/2007 | Weill | H04L 12/4633 370/389 |
| 2010/0235877 A1 | 9/2010 | Hu et al. | |
| 2011/0219426 A1* | 9/2011 | Kim | H04L 41/5058 726/1 |
| 2013/0208703 A1* | 8/2013 | Sugimoto | H04L 12/66 370/331 |
| 2015/0304865 A1* | 10/2015 | Poscher | H04W 76/10 370/252 |
| 2016/0337526 A1* | 11/2016 | Mandanapu | H04L 12/1435 |
| 2017/0142032 A1* | 5/2017 | Heinonen | H04L 49/70 |
| 2017/0359758 A1* | 12/2017 | Chigurupati | H04M 15/66 |
| 2018/0278518 A1* | 9/2018 | Xu | H04L 12/66 |

FOREIGN PATENT DOCUMENTS

| | | |
|---|---|---|
| CN | 101800967 A | 8/2010 |
| CN | 102065367 A | 5/2011 |
| CN | 102143135 A | 8/2011 |
| EP | 2629554 A1 | 8/2013 |
| EP | 2521385 B1 | 10/2016 |

* cited by examiner

PACKET PROCESSING METHOD, APPARATUS, AND SYSTEM

CROSS-REFERENCE TO RELATED APPLICATIONS

This application is a continuation of International Application No. PCT/CN2015/093853, filed on Nov. 5, 2015, the disclosure of which is hereby incorporated by reference in its entirety.

TECHNICAL FIELD

Embodiments of the present disclosure relate to the communications field, and in particular, to a packet processing method, apparatus, and system.

BACKGROUND

As an evolution direction of 3G technologies, LTE (Long Term Evolution) has become a mobile network evolution target of global mainstream mobile operators. The international standard organization 3GPP has put forward a complete new-generation network evolution architecture: an EPC (evolved packet core) architecture.

The EPC architecture mainly includes an MME (mobility management entity), an HSS (home subscriber server), a PCRF (policy and charging rules function) unit, and many gateways such as a TGW (Trusted gateway, or trusted access gateway), an SGW (serving gateway), and a PGW (packet data network gateway). A policy library is set in each gateway, and is used to perform policy matching for a packet service. As shown in FIG. 1, when receiving any packet, a gateway may perform packet inspection based on an OSI (Open System Interconnection) model layer 3 IP address or an OSI model layer 4 port number, and an OSI model layer 7 protocol number or application type. Then, the gateway determines a to-be-executed packet processing action such as charging, QoS control, bandwidth management, redirection, or URL filtering from a policy library according to a protocol/application type and included key field information that are obtained by means of packet inspection, or a system-defined rule. Finally, the gateway executes the packet processing action corresponding to the packet.

However, with increasing requirements of users for the Internet, a gateway is deployed closer to the users. As a result, there is a dramatic increase in a gateway quantity, for example, an increase from one PGW per province to one PGW per county. Therefore, configuration, updating, and maintenance of policy libraries in many gateways cause a large amount of homogenous maintenance work, and consequently network operation and maintenance costs are increased.

SUMMARY

Embodiments of the present disclosure provide a packet processing method, apparatus, and system. A policy library is deployed on a gateway control device in a centralized manner, and packet identification and policy execution are deployed on each gateway forwarding device, to effectively control network operation and maintenance costs.

To achieve the foregoing objective, the following technical solutions are used in the embodiments of the present disclosure.

According to a first aspect, an embodiment of the present disclosure provides a packet processing method, including: receiving, by a gateway control device, packet characteristic information that is of a first packet and that is sent by a gateway forwarding device, where the packet characteristic information is obtained after the gateway forwarding device performs packet inspection on the first packet; searching, by the gateway control device according to the packet characteristic information of the first packet, a prestored policy library for a first processing policy corresponding to the packet characteristic information, where the policy library stores a correspondence between a processing policy and an execution condition of the processing policy, and each processing policy stored in the policy library includes at least one packet processing action; and sending, by the gateway control device, the first processing policy to the gateway forwarding device, so that the gateway forwarding device executes a packet processing action in the first processing policy.

In this way, the gateway control device is configured to implement a function of a gateway control plane, and the gateway forwarding device is configured to implement a function of a gateway forwarding plane. No gateway forwarding device needs to store a policy library. Instead, the gateway control device centrally matches different processing policies in the preset policy library for various packets. Therefore, work such as configuration, updating, and maintenance needs to be performed only on the policy library in the gateway control device, and network operation and maintenance costs are greatly reduced.

With reference to the first aspect, in a first possible implementation of the first aspect, the packet characteristic information of the first packet includes Layer 3 and layer 4 characteristic information of the first packet of Open System Interconnection OSI model; and the searching, by the gateway control device according to the packet characteristic information of the first packet, a prestored policy library for a first processing policy corresponding to the packet characteristic information includes: searching, by the gateway control device, the policy library for at least one second processing policy corresponding to the layer 3 and layer 4 characteristic information; and determining, by the gateway control device, one of the at least one second processing policy as the first processing policy.

With reference to the first aspect, in a second possible implementation of the first aspect, the packet characteristic information of the first packet includes Layer 3 and layer 4 characteristic information of the first packet of Open System Interconnection OSI model; and the searching, by the gateway control device according to the packet characteristic information of the first packet, a prestored policy library for a first processing policy corresponding to the packet characteristic information includes: searching, by the gateway control device, the policy library for at least one second processing policy corresponding to the layer 3 and layer 4 characteristic information; if an execution condition of the second processing policy includes a matching rule for layer 7 network data, delivering, by the gateway control device, a first instruction message to the gateway forwarding device, where the first instruction message is used to instruct the gateway forwarding device to perform Layer 7 packet inspection of OSI model on a received second packet, and the second packet is a packet having same 5-tuple information as the first packet; and if receiving Layer 7 characteristic information of the second packet of OSI model and that is sent by the gateway forwarding device, determining, by the gateway control device from the at least one second processing policy, a first processing policy corresponding to the Layer 7 characteristic information of the second packet of OSI model.

With reference to the first aspect, in a third possible implementation of the first aspect, the packet characteristic information of the first packet includes Layer 3, layer 4, and layer 7 characteristic information of the first packet of OSI model; and the searching, by the gateway control device according to the packet characteristic information of the first packet, a prestored policy library for a first processing policy corresponding to the packet characteristic information includes: searching, by the gateway control device, the policy library for at least one second processing policy corresponding to the layer 3 and layer 4 characteristic information; and if an execution condition of the second processing policy includes a matching rule of the first packet for network data of OSI model, determining, by the gateway control device, one of the at least one second processing policy as the first processing policy according to the layer 7 characteristic information.

With reference to the third possible implementation of the first aspect, in a fourth possible implementation of the first aspect, after the searching, by the gateway control device, the policy library for at least one second processing policy corresponding to the layer 3 and layer 4 characteristic information, the method further includes: delivering, by the gateway control device, a second instruction message to the gateway forwarding device, where the second instruction message is used to instruct the gateway forwarding device to perform Layer 7 packet inspection of OSI model on a second packet, and the second packet is a packet having same 5-tuple information as the first packet; and if receiving Layer 7 characteristic information of the second packet of OSI model and that is sent by the gateway forwarding device, determining, by the gateway control device from the at least one second processing policy, a first processing policy corresponding to the Layer 7 characteristic information of the second packet of OSI model.

With reference to any one of the first aspect, or the first to the third possible implementations of the first aspect, in a fifth possible implementation of the first aspect, before the receiving, by a gateway control device, packet characteristic information that is of a first packet and that is sent by a gateway forwarding device, the method further includes: sending, by the gateway control device, at least one third processing policy in the policy library and an execution condition of the third processing policy to the gateway forwarding device.

With reference to any one of the first aspect, or the first to the third possible implementations of the first aspect, in a sixth possible implementation of the first aspect, before the receiving, by a gateway control device, packet characteristic information that is of a first packet and that is sent by a gateway forwarding device, the method further includes: sending, by the gateway control device, at least one application detection and control ADC processing policy to the gateway forwarding device.

With reference to the sixth possible implementation of the first aspect, in a seventh possible implementation of the first aspect, the packet characteristic information of the first packet includes OSI model layer 7 service type information of the first packet; and the searching, by the gateway control device according to the packet characteristic information of the first packet, a prestored policy library for a first processing policy corresponding to the packet characteristic information includes: searching, by the gateway control device, the policy library for the first processing policy corresponding to the OSI model layer 7 service type information of the first packet.

With reference to any one of the first aspect, or the first to the seventh possible implementations of the first aspect, in an eighth possible implementation of the first aspect, before the receiving, by a gateway control device, packet characteristic information that is of a first packet and that is sent by a gateway forwarding device, the method further includes: orchestrating, by the gateway control device into N object sets, a procedure in which the gateway forwarding device processes the first packet, where each object set includes an atomic action set required when the gateway forwarding device processes the first packet; and sending, by the gateway control device, the N object sets to the gateway forwarding device, so that the gateway forwarding device processes the first packet according to an atomic action set of each object in the N object sets.

According to a second aspect, an embodiment of the present disclosure provides a packet processing method, including: obtaining, by a gateway forwarding device, 5-tuple information of a first packet; performing, by the gateway forwarding device, packet inspection on the first packet if the gateway forwarding device stores no processing policy corresponding to the 5-tuple information, to obtain packet characteristic information of the first packet; sending, by the gateway forwarding device, the packet characteristic information of the first packet to a gateway control device, so that the gateway control device searches a prestored policy library for a first processing policy corresponding to the packet characteristic information; receiving, by the gateway forwarding device, the first processing policy sent by the gateway control device; and executing, by the gateway forwarding device, a packet processing action in the first processing policy.

With reference to the second aspect, in a first possible implementation of the second aspect, the performing, by the gateway forwarding device, packet inspection on the first packet, to obtain packet characteristic information of the first packet includes: performing, by the gateway forwarding device, Layer 3 and layer 4 packet inspection in OSI model on the first packet, and using obtained Layer 3 and layer 4 characteristic information of the first packet of OSI model as the packet characteristic information of the first packet.

With reference to the first possible implementation of the second aspect, in a second possible implementation of the second aspect, after the sending, by the gateway forwarding device, the packet characteristic information of the first packet to a gateway control device, the method further includes: if receiving a first instruction message sent by the gateway control device, performing, by the gateway forwarding device, Layer 7 packet inspection of OSI model on a received second packet, to obtain Layer 7 characteristic information of the second packet of OSI model, where the second packet is a packet having same 5-tuple information as the first packet; and sending, by the gateway forwarding device, the layer 7 characteristic information of the second packet to the gateway control device.

With reference to the second possible implementation of the second aspect, in a third possible implementation of the second aspect, the first instruction message includes the 5-tuple information of the first packet and a quantity of inspection times of performing the layer 7 packet inspection; and the performing, by the gateway forwarding device, Layer 7 packet inspection of OSI model on a second packet, to obtain Layer 7 characteristic information of the second packet of OSI model includes: performing, by the gateway forwarding device, the layer 7 packet inspection on the second packet according to the quantity of inspection times, to obtain the Layer 7 characteristic information of the second packet of OSI model.

With reference to the second aspect, in a fourth possible implementation of the second aspect, the performing, by the gateway forwarding device, packet inspection on the first packet, to obtain packet characteristic information of the first packet includes: performing, by the gateway forwarding device, Layer 3, layer 4, and layer 7 packet inspection of OSI model on the first packet, and using obtained Layer 3, layer 4, and layer 7 characteristic information of the first packet of OSI model as the packet characteristic information of the first packet.

With reference to the fourth possible implementation of the second aspect, in a fifth possible implementation of the second aspect, after the sending, by the gateway forwarding device, the packet characteristic information of the first packet to a gateway control device, the method further includes: if receiving a second instruction message sent by the gateway control device, performing, by the gateway forwarding device, Layer 7 packet inspection of OSI model on a second packet, to obtain Layer 7 characteristic information of the second packet of OSI model, where the second packet is a packet having same 5-tuple information as the first packet; and sending, by the gateway forwarding device, the layer 7 characteristic information of the second packet to the gateway control device.

With reference to the second aspect, in a sixth possible implementation of the second aspect, before the obtaining, by a gateway forwarding device, 5-tuple information of a first packet, the method further includes: receiving, by the gateway forwarding device, at least one third processing policy and an execution condition of the third processing policy that are sent by the gateway control device; the performing, by the gateway forwarding device, packet inspection on the first packet, to obtain packet characteristic information of the first packet includes: performing, by the gateway forwarding device, Layer 3 and layer 4 packet inspection in OSI model on the first packet, and using obtained Layer 3 and layer 4 characteristic information of the first packet of OSI model as the packet characteristic information of the first packet; and after the performing, by the gateway forwarding device, packet inspection on the first packet, to obtain packet characteristic information of the first packet, the method further includes: if the gateway forwarding device finds, from the at least one third processing policy, the first processing policy corresponding to the packet characteristic information, executing, by the gateway forwarding device, the packet processing action in the first processing policy on the first packet.

With reference to the second aspect, in a seventh possible implementation of the second aspect, before the obtaining, by a gateway forwarding device, 5-tuple information of a first packet, the method further includes: receiving, by the gateway forwarding device, at least one ADC processing policy sent by the gateway control device; and the performing, by the gateway forwarding device, packet inspection on the first packet, to obtain packet characteristic information of the first packet includes: performing, by the gateway forwarding device, Layer 7 packet inspection of OSI model on the first packet, to obtain layer 7 characteristic information of the first packet of OSI model; and determining, by the gateway forwarding device, OSI model layer 7 service type information of the first packet from the at least one ADC processing policy according to the OSI model layer 7 characteristic information of the first packet, and using the service type information as the packet characteristic information of the first packet.

With reference to any one of the second aspect, or the first to the seventh possible implementations of the second aspect, in an eighth possible implementation of the second aspect, after the executing, by the gateway forwarding device, a packet processing action in the first processing policy on the first packet, the method further includes: saving, by the gateway forwarding device, a correspondence between the first processing policy and the 5-tuple information; and if 5-tuple information that is of a third packet and that is obtained by the gateway forwarding device is the same as the 5-tuple information of the first packet, executing, by the gateway forwarding device, the packet processing action in the first processing policy on the third packet.

With reference to the second aspect, or the first to the eighth possible implementations of the second aspect, in a ninth possible implementation of the second aspect, before the obtaining, by a gateway forwarding device, 5-tuple information of a first packet, the method further includes: receiving, by the gateway forwarding device, N object sets sent by the gateway control device, where each object set includes an atomic action set required when the gateway forwarding device processes the first packet.

With reference to the ninth possible implementation of the second aspect, in a tenth possible implementation of the second aspect, the performing, by the gateway forwarding device, packet inspection on the first packet if the gateway forwarding device stores no processing policy corresponding to the 5-tuple information, to obtain packet characteristic information of the first packet includes: determining, by a bearer object of the gateway forwarding device according to a first object set in the N object sets by means of searching, whether a flow object corresponding to the 5-tuple information is stored; and if no flow object corresponding to the 5-tuple information is stored, performing, by the bearer object of the gateway forwarding device, packet inspection on the first packet, to obtain the packet characteristic information of the first packet.

With reference to the tenth possible implementation of the second aspect, in an eleventh possible implementation of the second aspect, the executing, by the gateway forwarding device, a packet processing action in the first processing policy includes: creating, by a forwarding plane control object of the gateway forwarding device according to a second object set in the N object sets and the first processing policy, the flow object corresponding to the 5-tuple information; and receiving, by the flow object of the gateway forwarding device, a packet whose 5-tuple information is the same as the 5-tuple information.

According to a third aspect, an embodiment of the present disclosure provides a gateway control device, including: a processor, a memory, a bus, and a transceiver, where the processor is configured to search, according to packet characteristic information of a first packet, a prestored policy library for a first processing policy corresponding to the packet characteristic information; the transceiver is configured to: receive the packet characteristic information that is of the first packet and that is sent by a gateway forwarding device, where the packet characteristic information is obtained after the gateway forwarding device performs packet inspection on the first packet; and send the first processing policy to the gateway forwarding device, so that the gateway forwarding device executes a packet processing action in the first processing policy; and the memory is configured to store the policy library, where the policy library stores a correspondence between a processing policy and an execution condition of the processing policy, and each processing policy stored in the policy library includes at least one packet processing action.

With reference to the third aspect, in a first possible implementation of the third aspect, the packet characteristic information of the first packet includes Layer 3 and layer 4 characteristic information of the first packet of Open System Interconnection OSI model; and the processor is further configured to: search the policy library for at least one second processing policy corresponding to the layer 3 and layer 4 characteristic information, and determine one of the at least one second processing policy as the first processing policy.

With reference to the third aspect, in a second possible implementation of the third aspect, the packet characteristic information of the first packet includes Layer 3 and layer 4 characteristic information of the first packet of Open System Interconnection OSI model; the processor is further configured to search the policy library for at least one second processing policy corresponding to the layer 3 and layer 4 characteristic information; the transceiver is further configured to: if an execution condition of the second processing policy includes a matching rule for layer 7 network data, deliver a first instruction message to the gateway forwarding device, where the first instruction message is used to instruct the gateway forwarding device to perform Layer 7 packet inspection of OSI model on a received second packet, and the second packet is a packet having same 5-tuple information as the first packet; and receive Layer 7 characteristic information of the second packet of OSI model and that is sent by the gateway forwarding device; and the processor is further configured to determine, from the at least one second processing policy, a first processing policy corresponding to the Layer 7 characteristic information of the second packet of OSI model.

With reference to the third aspect, in a third possible implementation of the third aspect, the packet characteristic information of the first packet includes Layer 3, layer 4, and layer 7 characteristic information of the first packet of OSI model; and the processor is further configured to: search the policy library for at least one second processing policy corresponding to the layer 3 and layer 4 characteristic information; and if an execution condition of the second processing policy includes a matching rule of the first packet for network data of OSI model, determine one of the at least one second processing policy as the first processing policy according to the layer 7 characteristic information.

With reference to the third possible implementation of the third aspect, in a fourth possible implementation of the third aspect, the transceiver is further configured to: deliver a second instruction message to the gateway forwarding device, where the second instruction message is used to instruct the gateway forwarding device to perform Layer 7 packet inspection of OSI model on a second packet, and the second packet is a packet having same 5-tuple information as the first packet; and receive Layer 7 characteristic information of the second packet of OSI model and that is sent by the gateway forwarding device; and the processor is further configured to determine, from the at least one second processing policy, a first processing policy corresponding to the Layer 7 characteristic information of the second packet of OSI model.

With reference to any one of the third aspect, or the first to the third possible implementations of the third aspect, in a fifth possible implementation of the third aspect, the transceiver is further configured to send at least one third processing policy in the policy library and an execution condition of the third processing policy to the gateway forwarding device.

With reference to any one of the third aspect, or the first to the third possible implementations of the third aspect, in a sixth possible implementation of the third aspect, the transceiver is further configured to send at least one application detection and control ADC processing policy to the gateway forwarding device.

With reference to the sixth possible implementation of the third aspect, in a seventh possible implementation of the third aspect, the packet characteristic information of the first packet includes OSI model layer 7 service type information of the first packet; and the processor is further configured to search the policy library for the first processing policy corresponding to the OSI model layer 7 service type information of the first packet.

With reference to any one of the third aspect, or the first to the sixth possible implementations of the third aspect, in a seventh possible implementation of the third aspect, the processor is further configured to orchestrate, into N object sets, a procedure in which the gateway forwarding device processes the first packet, where each object set includes an atomic action set required when the gateway forwarding device processes the first packet; and the transceiver is further configured to send the N object sets to the gateway forwarding device, so that the gateway forwarding device processes the first packet according to an atomic action set of each object in the N object sets.

According to a fourth aspect, an embodiment of the present disclosure provides a gateway forwarding device, including: a processor, a memory, a bus, and a transceiver, where the transceiver is configured to: obtain 5-tuple information of a first packet, send packet characteristic information of the first packet to a gateway control device, and receive a first processing policy sent by the gateway control device; and the processor is configured to: perform packet inspection on the first packet if the gateway forwarding device stores no processing policy corresponding to the 5-tuple information, to obtain the packet characteristic information of the first packet; and execute a packet processing action in the first processing policy.

With reference to the fourth aspect, in a first possible implementation of the fourth aspect, the processor is configured to: perform Layer 3 and layer 4 packet inspection in OSI model on the first packet, and use obtained Layer 3 and layer 4 characteristic information of the first packet of OSI model as the packet characteristic information of the first packet.

With reference to the first possible implementation of the fourth aspect, in a second possible implementation of the fourth aspect, the processor is further configured to: if a first instruction message sent by the gateway control device is received, perform Layer 7 packet inspection of OSI model on a received second packet, to obtain Layer 7 characteristic information of the second packet of OSI model, where the second packet is a packet having same 5-tuple information as the first packet; and the transceiver is further configured to send the layer 7 characteristic information of the second packet to the gateway control device.

With reference to the second possible implementation of the fourth aspect, in a third possible implementation of the fourth aspect, the first instruction message includes the 5-tuple information of the first packet and a quantity of inspection times of performing the layer 7 packet inspection; and the processor is configured to perform the layer 7 packet inspection on the second packet according to the quantity of inspection times, to obtain the Layer 7 characteristic information of the second packet of OSI model.

With reference to the fourth aspect, in a fourth possible implementation of the fourth aspect, the processor is configured to: perform Layer 3, layer 4, and layer 7 packet inspection of OSI model on the first packet, and use obtained Layer 3, layer 4, and layer 7 characteristic information of the first packet of OSI model as the packet characteristic information of the first packet.

With reference to the fourth possible implementation of the fourth aspect, in a fifth possible implementation of the fourth aspect, the processor is further configured to: if a second instruction message sent by the gateway control device is received, perform Layer 7 packet inspection of OSI model on a second packet, to obtain Layer 7 characteristic information of the second packet of OSI model, where the second packet is a packet having same 5-tuple information as the first packet; and the transceiver is further configured to send the layer 7 characteristic information of the second packet to the gateway control device.

With reference to the fourth aspect, in a sixth possible implementation of the fourth aspect, the transceiver is further configured to receive at least one third processing policy and an execution condition of the third processing policy that are sent by the gateway control device; and the processor is further configured to: perform Layer 3 and layer 4 packet inspection in OSI model on the first packet, and use obtained Layer 3 and layer 4 characteristic information of the first packet of OSI model as the packet characteristic information of the first packet; and if the first processing policy corresponding to the packet characteristic information is found from the at least one third processing policy, execute the packet processing action in the first processing policy on the first packet.

With reference to the fourth aspect, in a seventh possible implementation of the fourth aspect, the transceiver is further configured to receive at least one ADC processing policy sent by the gateway control device; and the processor is further configured to: perform Layer 7 packet inspection of OSI model on the first packet, to obtain layer 7 characteristic information of the first packet of OSI model; and determine OSI model layer 7 service type information of the first packet from the at least one ADC processing policy according to the OSI model layer 7 characteristic information of the first packet, and use the service type information as the packet characteristic information of the first packet.

With reference to any one of the fourth aspect, or the first to the seventh possible implementations of the fourth aspect, in an eighth possible implementation of the fourth aspect, the memory is configured to save a correspondence between the first processing policy and the 5-tuple information; and the processor is further configured to: if 5-tuple information that is of a third packet and that is obtained by the gateway forwarding device is the same as the 5-tuple information of the first packet, execute the packet processing action in the first processing policy on the third packet.

With reference to any one of the fourth aspect, or the first to the eighth possible implementations of the fourth aspect, in a ninth possible implementation of the fourth aspect, the transceiver is further configured to receive N object sets sent by the gateway control device, where each object set includes an atomic action set required when the gateway forwarding device processes the first packet.

According to a fifth aspect, an embodiment of the present disclosure provides a gateway control device, including: a receiving unit, a matching unit, and a sending unit, where the receiving unit is configured to receive packet characteristic information that is of a first packet and that is sent by a gateway forwarding device, where the packet characteristic information is obtained after the gateway forwarding device performs packet inspection on the first packet; the matching unit is configured to search, according to the packet characteristic information of the first packet, a prestored policy library for a first processing policy corresponding to the packet characteristic information, where the policy library stores a correspondence between a processing policy and an execution condition of the processing policy, and each processing policy stored in the policy library includes at least one packet processing action; and the sending unit is configured to send the first processing policy to the gateway forwarding device, so that the gateway forwarding device executes a packet processing action in the first processing policy.

With reference to the fifth aspect, in a first possible implementation of the fifth aspect, the packet characteristic information of the first packet includes Layer 3 and layer 4 characteristic information of the first packet of OSI model; and the matching unit is configured to: search the policy library for at least one second processing policy corresponding to the layer 3 and layer 4 characteristic information, and determine one of the at least one second processing policy as the first processing policy.

With reference to the fifth aspect, in a second possible implementation of the fifth aspect, the packet characteristic information of the first packet includes Layer 3 and layer 4 characteristic information of the first packet of OSI model; the matching unit is configured to search the policy library for at least one second processing policy corresponding to the layer 3 and layer 4 characteristic information; the sending unit is further configured to: if an execution condition of the second processing policy includes a matching rule for layer 7 network data, deliver a first instruction message to the gateway forwarding device, where the first instruction message is used to instruct the gateway forwarding device to perform Layer 7 packet inspection of OSI model on a received second packet, and the second packet is a packet having same 5-tuple information as the first packet; and the matching unit is further configured to: if Layer 7 characteristic information of the second packet of OSI model and that is sent by the gateway forwarding device is received, determine, by the gateway control device from the at least one second processing policy, a first processing policy corresponding to the Layer 7 characteristic information of the second packet of OSI model.

With reference to the fifth aspect, in a third possible implementation of the fifth aspect, the packet characteristic information of the first packet includes Layer 3, layer 4, and layer 7 characteristic information of the first packet of OSI model; and the matching unit is configured to: search the policy library for at least one second processing policy corresponding to the layer 3 and layer 4 characteristic information; and if an execution condition of the second processing policy includes a matching rule of the first packet for network data of OSI model, determine one of the at least one second processing policy as the first processing policy according to the layer 7 characteristic information.

With reference to the third possible implementation of the fifth aspect, in a fourth possible implementation of the fifth aspect, the sending unit is further configured to deliver a second instruction message to the gateway forwarding device, where the second instruction message is used to instruct the gateway forwarding device to perform Layer 7 packet inspection of OSI model on a second packet, and the second packet is a packet having same 5-tuple information as the first packet; and the matching unit is further configured to: if Layer 7 characteristic information of the second packet of OSI model and that is sent by the gateway forwarding device is received, determine, from the at least one second processing policy, a first processing policy corresponding to the Layer 7 characteristic information of the second packet of OSI model.

With reference to any one of the fifth aspect, or the first to the fourth possible implementations of the fifth aspect, in a fifth possible implementation of the fifth aspect, the sending unit is further configured to send at least one third processing policy in the policy library and an execution condition of the third processing policy to the gateway forwarding device.

With reference to any one of the fifth aspect, or the first to the fourth possible implementations of the fifth aspect, in a sixth possible implementation of the fifth aspect, the sending unit is further configured to send at least one ADC processing policy to the gateway forwarding device.

In this case, the packet characteristic information of the first packet includes OSI model layer 7 service type information of the first packet; and the matching unit is further configured to search the policy library for the first processing policy corresponding to the OSI model layer 7 service type information of the first packet.

According to a sixth aspect, an embodiment of the present disclosure provides a gateway forwarding device, including: an obtaining unit, an inspection unit, a sending unit, and an execution unit, where the obtaining unit is configured to: obtain 5-tuple information of a first packet, and receive a first processing policy sent by a gateway control device; the inspection unit is configured to perform packet inspection on the first packet if the gateway forwarding device stores no processing policy corresponding to the 5-tuple information, to obtain packet characteristic information of the first packet; the sending unit is configured to send the packet characteristic information of the first packet to the gateway control device, so that the gateway control device searches a prestored policy library for the first processing policy corresponding to the packet characteristic information; and the execution unit is configured to execute a packet processing action in the first processing policy.

With reference to the sixth aspect, in a first possible implementation of the sixth aspect, the inspection unit is configured to: perform Layer 3 and layer 4 packet inspection in OSI model on the first packet, and use obtained Layer 3 and layer 4 characteristic information of the first packet of OSI model as the packet characteristic information of the first packet.

In this case, if a first instruction message sent by the gateway control device is received, the inspection unit is further configured to perform Layer 7 packet inspection of OSI model on a received second packet, to obtain Layer 7 characteristic information of the second packet of OSI model. The second packet is a packet having same 5-tuple information as the first packet. Then, the sending unit is configured to send the layer 7 characteristic information of the second packet to the gateway control device.

With reference to the first possible implementation of the sixth aspect, in a second possible implementation of the sixth aspect, the first instruction message includes the 5-tuple information of the first packet and a quantity of inspection times of performing the layer 7 packet inspection; and the inspection unit is configured to perform the layer 7 packet inspection on the second packet according to the quantity of inspection times, to obtain the Layer 7 characteristic information of the second packet of OSI model.

With reference to the sixth aspect, in a third possible implementation of the sixth aspect, the inspection unit is configured to: perform Layer 3, layer 4, and layer 7 packet inspection of OSI model on the first packet, and use obtained Layer 3, layer 4, and layer 7 characteristic information of the first packet of OSI model as the packet characteristic information of the first packet.

In this case, if a second instruction message sent by the gateway control device is received, the inspection unit is further configured to perform Layer 7 packet inspection of OSI model on a second packet, to obtain Layer 7 characteristic information of the second packet of OSI model. The second packet is a packet having same 5-tuple information as the first packet. Then, the sending unit is configured to send the layer 7 characteristic information of the second packet to the gateway control device.

With reference to the sixth aspect, in a fourth possible implementation of the sixth aspect, the obtaining unit is further configured to receive at least one third processing policy and an execution condition of the third processing policy that are sent by the gateway control device.

In this case, the inspection unit is configured to: perform Layer 3 and layer 4 packet inspection in OSI model on the first packet, and use obtained Layer 3 and layer 4 characteristic information of the first packet of OSI model as the packet characteristic information of the first packet; and the execution unit is configured to: if the gateway forwarding device finds, from the at least one third processing policy, the first processing policy corresponding to the packet characteristic information, execute the packet processing action in the first processing policy on the first packet.

With reference to the sixth aspect, in a fifth possible implementation of the sixth aspect, the obtaining unit is further configured to receive at least one ADC processing policy sent by the gateway control device; and in this case, the inspection unit is configured to: perform Layer 7 packet inspection of OSI model on the first packet, to obtain layer 7 characteristic information of the first packet of OSI model; and determine OSI model layer 7 service type information of the first packet from the at least one ADC processing policy according to the OSI model layer 7 characteristic information of the first packet, and use the service type information as the packet characteristic information of the first packet.

With reference to the sixth aspect, and the first to the fourth possible implementations of the sixth aspect, in a fifth possible implementation of the sixth aspect, the gateway forwarding device further includes: a saving unit, configured to save a correspondence between the first processing policy and the 5-tuple information; and in this case, the execution unit is further configured to: if obtained 5-tuple information of a third packet is the same as the 5-tuple information that is of the first packet and that is in the saving unit, execute the packet processing action in the first processing policy on the third packet.

According to a seventh aspect, an embodiment of the present disclosure provides a packet processing system, including the gateway control device according to the third aspect or the fifth aspect and at least one gateway forwarding device according to the fourth aspect or the sixth aspect, where the at least one gateway forwarding device is connected to the gateway control device.

In this way, the gateway control device may be configured to implement a function of a gateway control plane, and the gateway forwarding device is configured to implement a function of a gateway forwarding plane. No gateway forwarding device needs to store a policy library. Instead, the gateway control device centrally matches different processing policies in the preset policy library for various packets. Therefore, work such as configuration, updating, and maintenance needs to be performed only on the policy library in the gateway control device, and network operation and maintenance costs are greatly reduced.

BRIEF DESCRIPTION OF DRAWINGS

To describe the technical solutions in the embodiments of the present disclosure or in the conventional art more clearly, the following briefly describes the accompanying drawings required for describing the embodiments or the conventional art.

DESCRIPTION OF EMBODIMENTS

The following clearly describes the technical solutions in the embodiments of the present disclosure with reference to the accompanying drawings in the embodiments of the present disclosure. Apparently, the described embodiments are only some but not all of the embodiments of the present disclosure.

In addition, the terms "first" and "second" are only intended for a purpose of description, and shall not be understood as an indication or implication of relative importance or implicit indication of a quantity of indicated technical features. Therefore, a feature limited by "first" or "second" may explicitly or implicitly include one or more features. In the description of the present disclosure, "a plurality of" means two or more unless otherwise stated.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Figure 1:
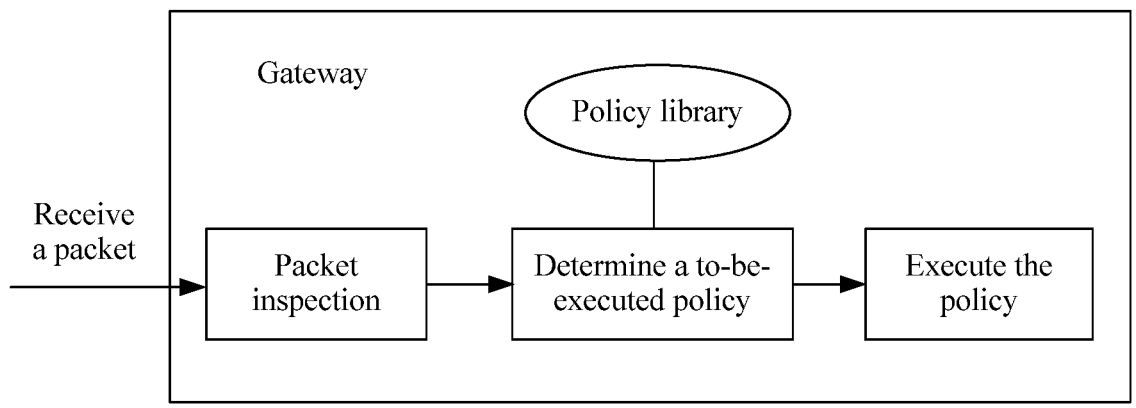
FIG. 1 is a schematic flowchart of packet processing in the conventional art.
Figure 2:
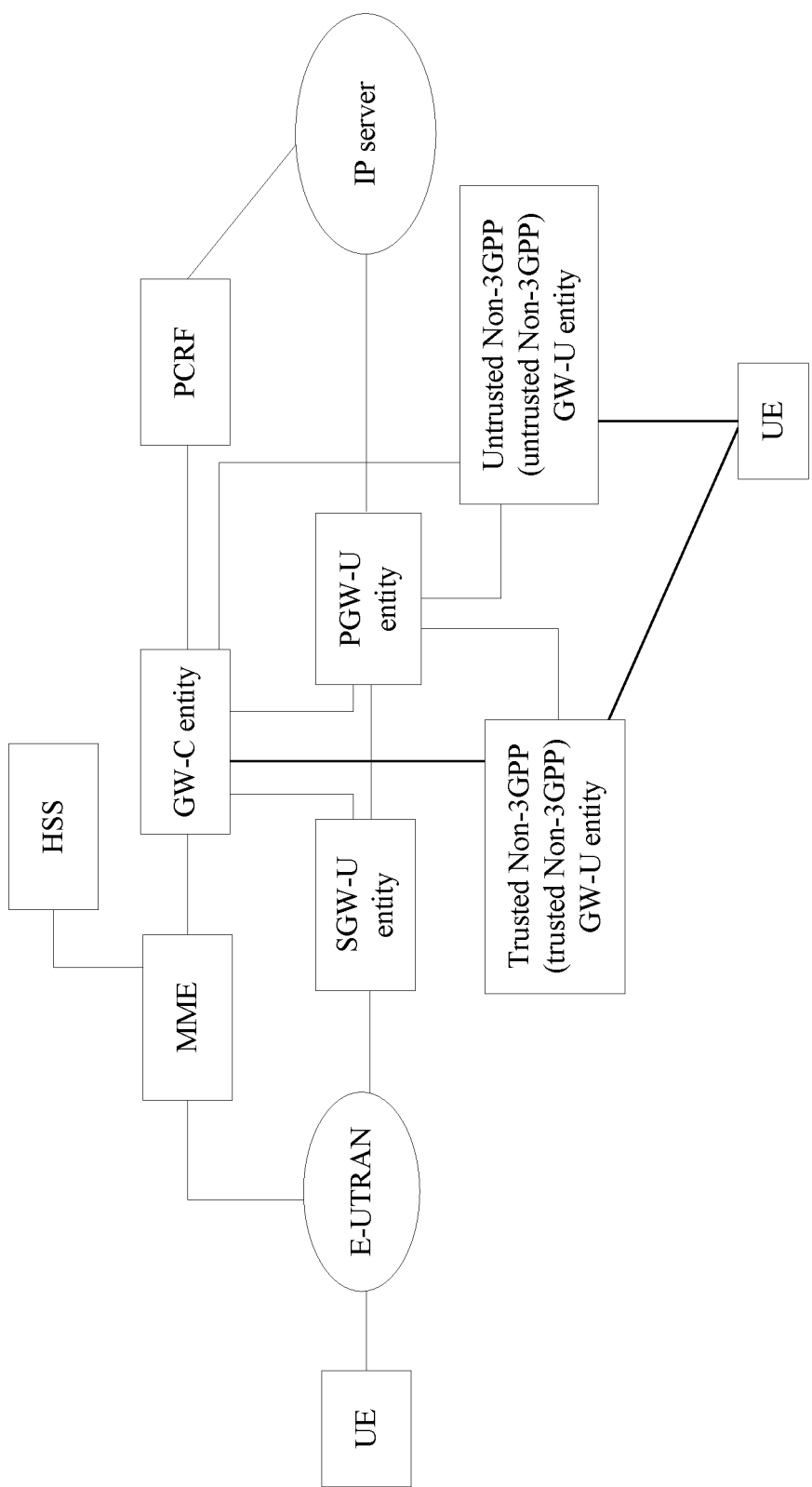
FIG. 2 is a schematic diagram of an application scenario of a packet processing method according to an embodiment of the present disclosure.

The embodiments of the present disclosure provide a packet processing method applicable to a packet exchange system between gateways, to resolve the following problem: Due to a dramatic increase in a gateway quantity, there is a large amount of homogenous maintenance work such as configuration, updating, and maintenance of policy libraries in many gateways, and consequently network operation and maintenance costs are increased. The system may be based on an EPC architecture, and includes an E-UTRAN (evolved universal terrestrial radio access network), an MME, an HSS, a PCRF, many gateways, and other entity devices. However, different from the conventional art, as shown in FIG. 2, in the embodiments of the present disclosure, a conventional gateway is decomposed into a gateway control device (that is, a GW-C entity) and a gateway forwarding device (for example, an SGW-U entity or a PGW-U entity). The gateway control device is configured to implement a function of a gateway control plane, and the gateway forwarding device is configured to implement a function of a gateway forwarding plane.

In this way, all gateway forwarding devices perform packet inspection on various received packets, and then report packet inspection results to the gateway control device. The gateway control device centrally matches different processing policies in a preset policy library for the various packets based on the packet inspection results, and delivers a matched processing policy to a corresponding gateway forwarding device, so that the gateway forwarding device executes a packet processing action in the processing policy. It can be learned that no gateway forwarding device needs to store a policy library. Instead, the gateway control device centrally matches different processing policies in the preset policy library for various packets. Therefore, work such as configuration, updating, and maintenance needs to be performed only on the policy library in the gateway control device, and network operation and maintenance costs are greatly reduced.

Embodiment 1

Figure 3:
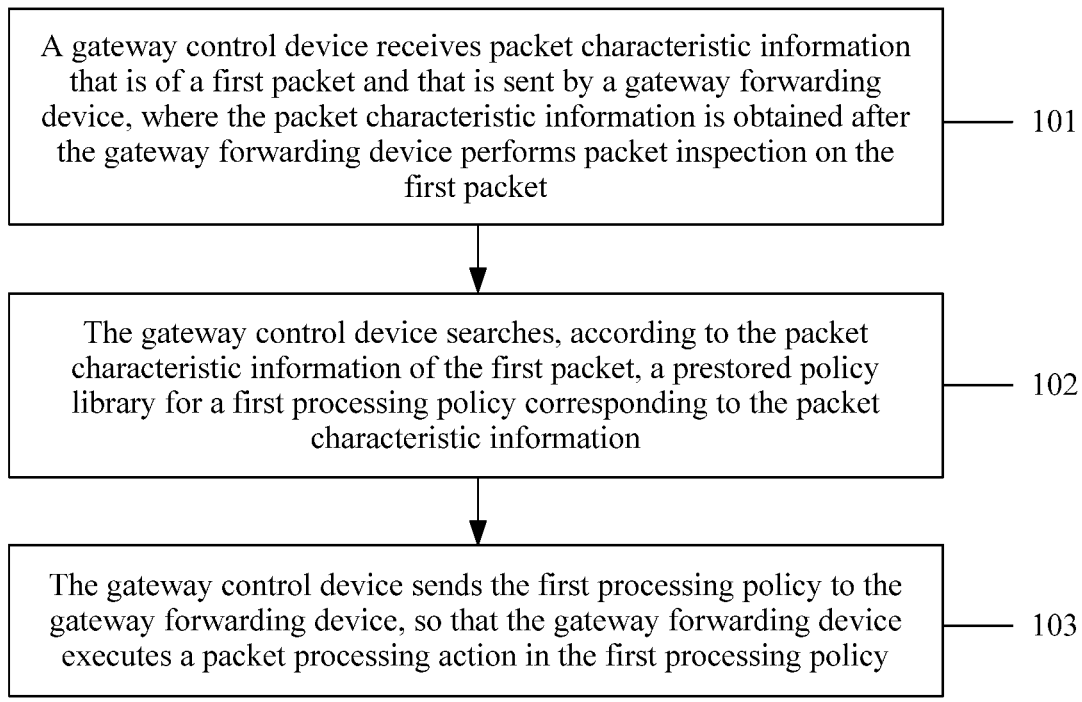
FIG. 3 is a first schematic flowchart of a packet processing method according to an embodiment of the present disclosure.

An embodiment of the present disclosure provides a packet processing method. As shown in FIG. 3, the method includes the following steps:

101. A gateway control device receives packet characteristic information that is of a first packet and that is sent by a gateway forwarding device, where the packet characteristic information is obtained after the gateway forwarding device performs packet inspection on the first packet.

102. The gateway control device searches, according to the packet characteristic information of the first packet, a prestored policy library for a first processing policy corresponding to the packet characteristic information.

103. The gateway control device sends the first processing policy to the gateway forwarding device, so that the gateway forwarding device executes a packet processing action in the first processing policy.

In step 101, after receiving the first packet, the gateway forwarding device performs packet inspection on the first packet, to obtain the packet characteristic information of the first packet. For example, the gateway forwarding device performs SPI (simple packet inspection) on the first packet, to obtain layer 3 and layer 4 characteristic information of the first packet of OSI model, such as a destination IP address, a destination port number, and a source DSCP (differentiated services code point) of the first packet. In this case, the gateway forwarding device sends the packet characteristic information of the first packet to the gateway control device, so that gateway control device performs policy matching according to the packet characteristic information of the first packet.

In step 102, the gateway control device searches, according to the packet characteristic information that is of the first packet and that is received in step 101, the prestored policy library for the first processing policy corresponding to the packet characteristic information.

The policy library stores at least one processing policy, and the policy library further stores a correspondence between any processing policy and an execution condition of the processing policy. Each processing policy in the policy library includes at least one packet processing action.

For example, the policy library is shown in Table 1. The policy library stores several processing policies. Each processing policy correspondingly includes at least one packet processing action. The packet processing action is used to indicate a packet processing action such as charging or header enrichment. In addition, the policy library further stores an execution condition of each processing policy. For example, the execution condition includes an OSI model layer 3 and layer 4 execution condition, a matching rule for network data of OSI model (that is, L7 protocol), a URL (uniform resource locator), a priority, and the like.

TABLE 1

| Processing policy | Layer 3 and layer 4 execution condition | Layer 7 network data matching rule | URL | Priority |
|---|---|---|---|---|
| First processing policy | Any IP to Taobao IP | None | None | 10 |
| Second processing policy | Any IP to any IP | http | taobao.com | 20 |
| . . . | . . . | . . . | . . . | . . . |

Specifically, the gateway control device searches for an execution condition that the packet characteristic information of the first packet meets. For example, the packet characteristic information of the first packet includes Layer 3 and layer 4 characteristic information of the first packet of OSI model, and the characteristic information may be any IP (Internet Protocol) to Taobao IP. In this case, the gateway control device searches for a processing policy that meets the layer 3 and layer 4 execution condition in the policy library, and then determines, by means of searching, whether an execution condition of the processing policy includes a matching rule for layer 7 network data. If the execution condition of the processing policy includes a matching rule for layer 7 network data, the gateway control device continues to perform matching according to layer 7 packet characteristic information, and finally finds the first processing policy corresponding to the packet characteristic information of the first packet.

Further, if a plurality of first processing policies are corresponding to the packet characteristic information of the first packet, the gateway control device uses, as the first processing policy, a processing policy that has a highest priority (that is, a minimum priority value).

It should be noted that the packet characteristic information that is of the first packet and that is obtained in step 101 may include Layer 3 and layer 4 characteristic information of the first packet of OSI model; or may include Layer 3, layer 4, and layer 7 characteristic information of the first packet of OSI model; or may include the first packet, and Layer 3 and layer 4 characteristic information of the first packet of OSI model; or includes OSI model layer 7 service type information of the first packet. These specific cases of the packet characteristic information of the first packet are described one by one in subsequent embodiments, and therefore details are not further described herein.

Further, in step 103, the gateway control device sends the first processing policy obtained in step 102 to the gateway forwarding device, so that the gateway forwarding device executes, according to the packet processing action in the first processing policy, the packet processing action in the first processing policy on the first packet and a packet that is subsequently received and that has same 5-tuple information as the first packet.

For example, if the first processing policy includes an ID of a charging policy and an ID of a network speed limiting policy, the gateway forwarding device executes the charging policy and the network speed limiting policy on the first packet according to the ID of the charging policy and the ID of the network speed limiting policy.

Figure 4:
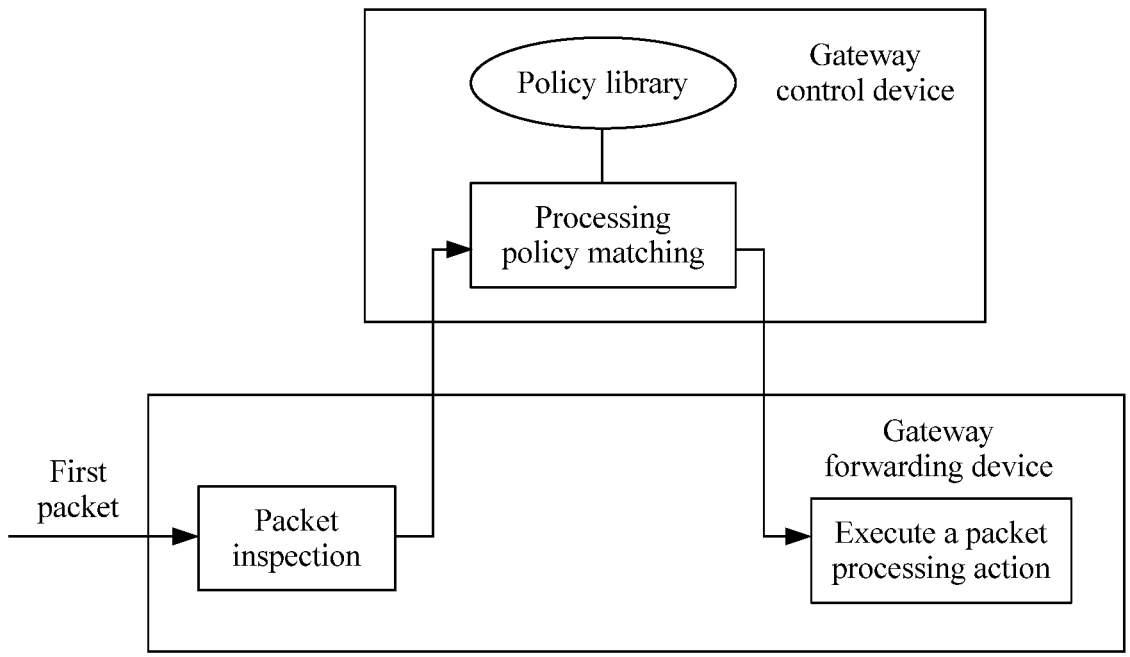
FIG. 4 is a first schematic flowchart of packet processing according to an embodiment of the present disclosure.

At this point, as shown in FIG. 4, the policy library is preset in the gateway control device. In this way, the gateway forwarding device sends, to the gateway control device, the packet characteristic information obtained after the gateway forwarding device performs packet inspection on the received first packet. The gateway control device performs processing policy matching for the first packet according to the policy library and the obtained packet characteristic information, to obtain the first processing policy corresponding to the packet characteristic information of the first packet, and sends the first processing policy to the gateway forwarding device. Finally, the gateway forwarding device executes a corresponding packet processing action according to the first processing policy.

Figure 5:
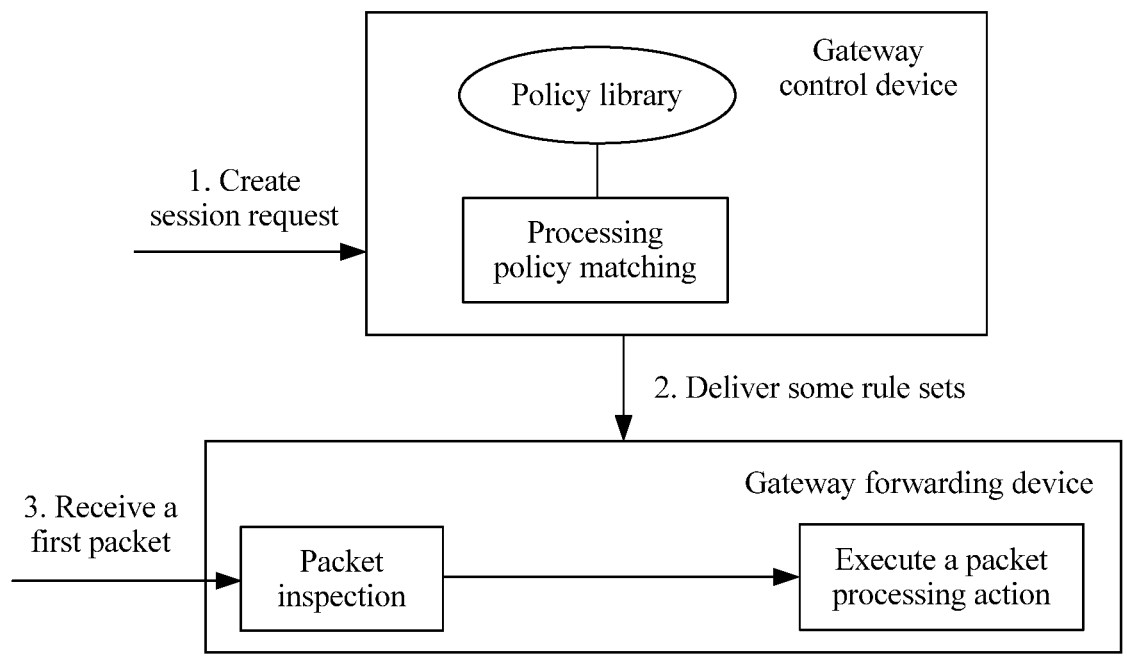
FIG. 5 is a second schematic flowchart of packet processing according to an embodiment of the present disclosure.

Alternatively, as shown in FIG. 5, before the gateway forwarding device receives the first packet, when receiving a create session request (for example, receiving a create session message from an MME), the gateway control device may send, to the gateway forwarding device, some processing policies (for example, processing policies that have relatively high priorities and that are corresponding to a layer 3 and a layer 4 characteristic information) in the policy library in the gateway control device and execution conditions corresponding to the processing policies. In this way, after performing packet inspection on the received first packet, the gateway forwarding device may first match, according to the execution conditions, the obtained packet characteristic information against the some processing policies sent by the gateway control device. If the matching succeeds, that is, if the first processing policy corresponding to the packet characteristic information of the first packet is found, the gateway forwarding device may directly execute a corresponding packet processing action according to the first processing policy. Certainly, if the matching fails, the gateway forwarding device sends the obtained packet characteristic information to the gateway control device. The gateway control device performs processing policy matching for the first packet according to the policy library and the obtained packet characteristic information, to obtain the first processing policy corresponding to the packet characteristic information of the first packet, and sends the first processing policy to the gateway forwarding device. Finally, the gateway forwarding device executes a corresponding packet processing action according to the first processing policy.

Figure 6:
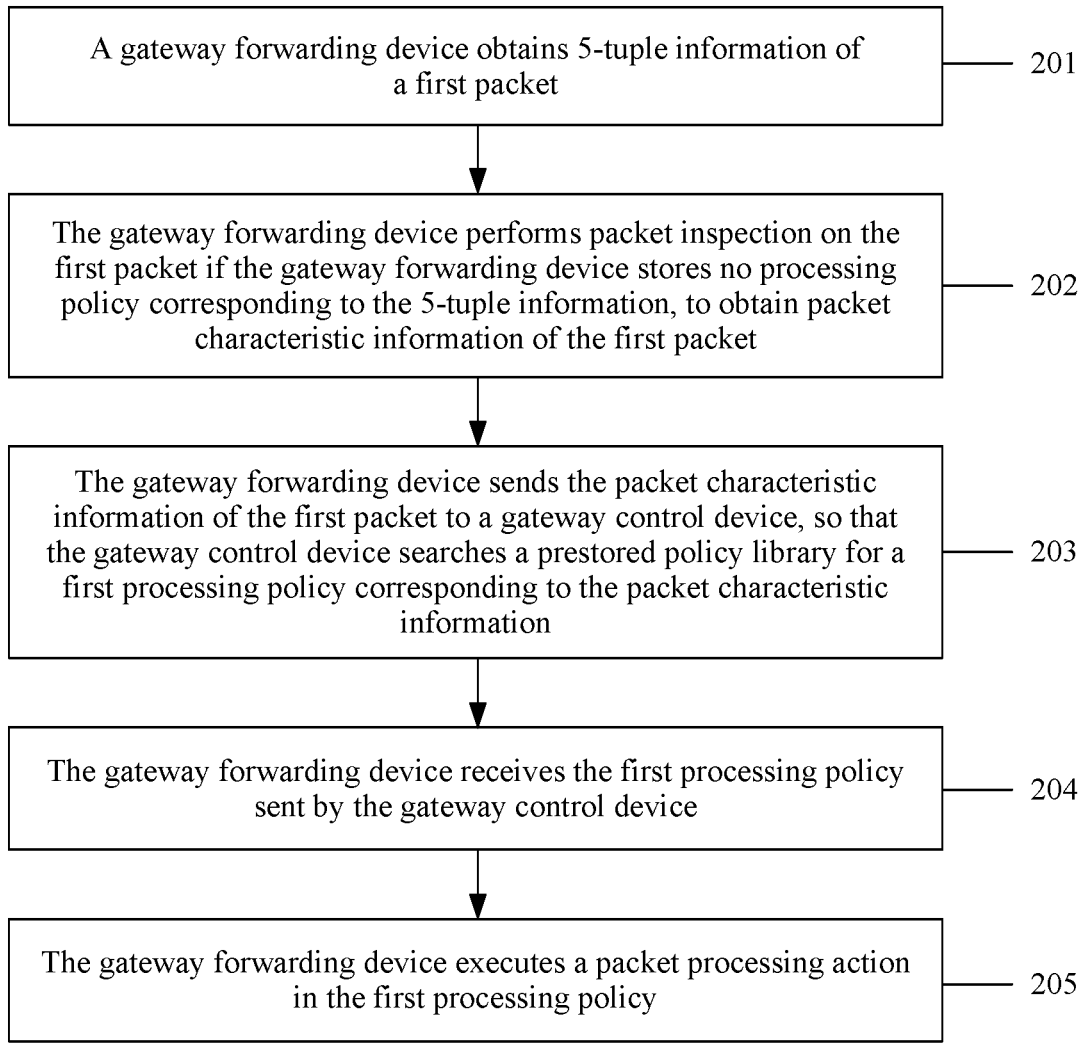
FIG. 6 is a second schematic flowchart of a packet processing method according to an embodiment of the present disclosure.

An embodiment of the present disclosure provides a packet processing method. As shown in FIG. 6, the method includes the following steps:

201. A gateway forwarding device obtains 5-tuple information of a first packet.

202. The gateway forwarding device performs packet inspection on the first packet if the gateway forwarding device stores no processing policy corresponding to the 5-tuple information, to obtain packet characteristic information of the first packet.

203. The gateway forwarding device sends the packet characteristic information of the first packet to a gateway control device, so that the gateway control device searches a prestored policy library for a first processing policy corresponding to the packet characteristic information.

204. The gateway forwarding device receives the first processing policy sent by the gateway control device.

205. The gateway forwarding device executes a packet processing action in the first processing policy.

In step 201, after receiving the first packet sent by another network entity, the gateway forwarding device performs header inspection on the first packet, to obtain the 5-tuple information of the first packet, that is, a source IP address, a source port, a destination IP address, a destination port, and a transport layer protocol of the first packet.

In step 202, the gateway forwarding device determines, by means of searching according to the 5-tuple information of the first packet, whether the gateway forwarding device stores the processing policy corresponding to the 5-tuple information. The gateway forwarding device performs packet inspection on the first packet if the gateway forwarding device stores no processing policy corresponding to the 5-tuple information, to obtain the packet characteristic information of the first packet.

Specifically, the gateway forwarding device may perform Layer 3 and layer 4 packet inspection in OSI model on the first packet, and use obtained Layer 3 and layer 4 characteristic information of the first packet of OSI model as the packet characteristic information of the first packet.

Alternatively, the gateway forwarding device may perform Layer 3, layer 4, and layer 7 packet inspection of OSI model on the first packet, and use obtained Layer 3, layer 4, and layer 7 characteristic information of the first packet of OSI model as the packet characteristic information of the first packet.

Alternatively, the gateway forwarding device may perform Layer 7 packet inspection of OSI model on the first packet, and use obtained OSI model layer 7 service type information of the first packet as the packet characteristic information of the first packet.

In addition, if the gateway forwarding device stores the processing policy corresponding to the 5-tuple information obtained in step 201, the gateway forwarding device may directly execute a corresponding packet processing action according to the processing policy corresponding to the 5-tuple information.

Further, in step 203, the gateway forwarding device sends the packet characteristic information of the first packet to the gateway control device, so that the gateway control device searches the prestored policy library for the first processing policy corresponding to the packet characteristic information.

Specifically, for a method in which the gateway control device searches the prestored policy library for the first processing policy corresponding to the packet characteristic information, refer to steps 101 to 103 in the foregoing embodiment. Therefore, details are not described herein again.

In step 204, if the gateway control device finds, from the prestored policy library, the first processing policy corresponding to the packet characteristic information, the gateway forwarding device receives the first processing policy sent by the gateway control device.

Then, in step 205, the gateway forwarding device executes, according to an ID of the packet processing action in the first processing policy, the packet processing action in the first processing policy on the first packet and a packet that is subsequently received and that has same 5-tuple information as the first packet.

At this point, according to the packet processing method provided in this embodiment of the present disclosure, the gateway forwarding device obtains the packet characteristic information of the first packet after performing packet inspection on the received first packet, and sends the packet characteristic information to the gateway control device. The gateway control device searches, according to the packet characteristic information of the first packet, the prestored policy library for the first processing policy corresponding to the packet characteristic information, and then sends the first processing policy to the gateway forwarding device, so that the gateway forwarding device executes the packet processing action in the first processing policy on the first packet. In this way, the gateway control device is configured to implement a function of a gateway control plane, and the gateway forwarding device is configured to implement a function of a gateway forwarding plane. No gateway forwarding device needs to store a policy library. Instead, the gateway control device centrally matches different processing policies in the preset policy library for various packets. Therefore, work such as configuration, updating, and maintenance needs to be performed only on the policy library in the gateway control device, and network operation and maintenance costs are greatly reduced.

Embodiment 2

Figure 7A:
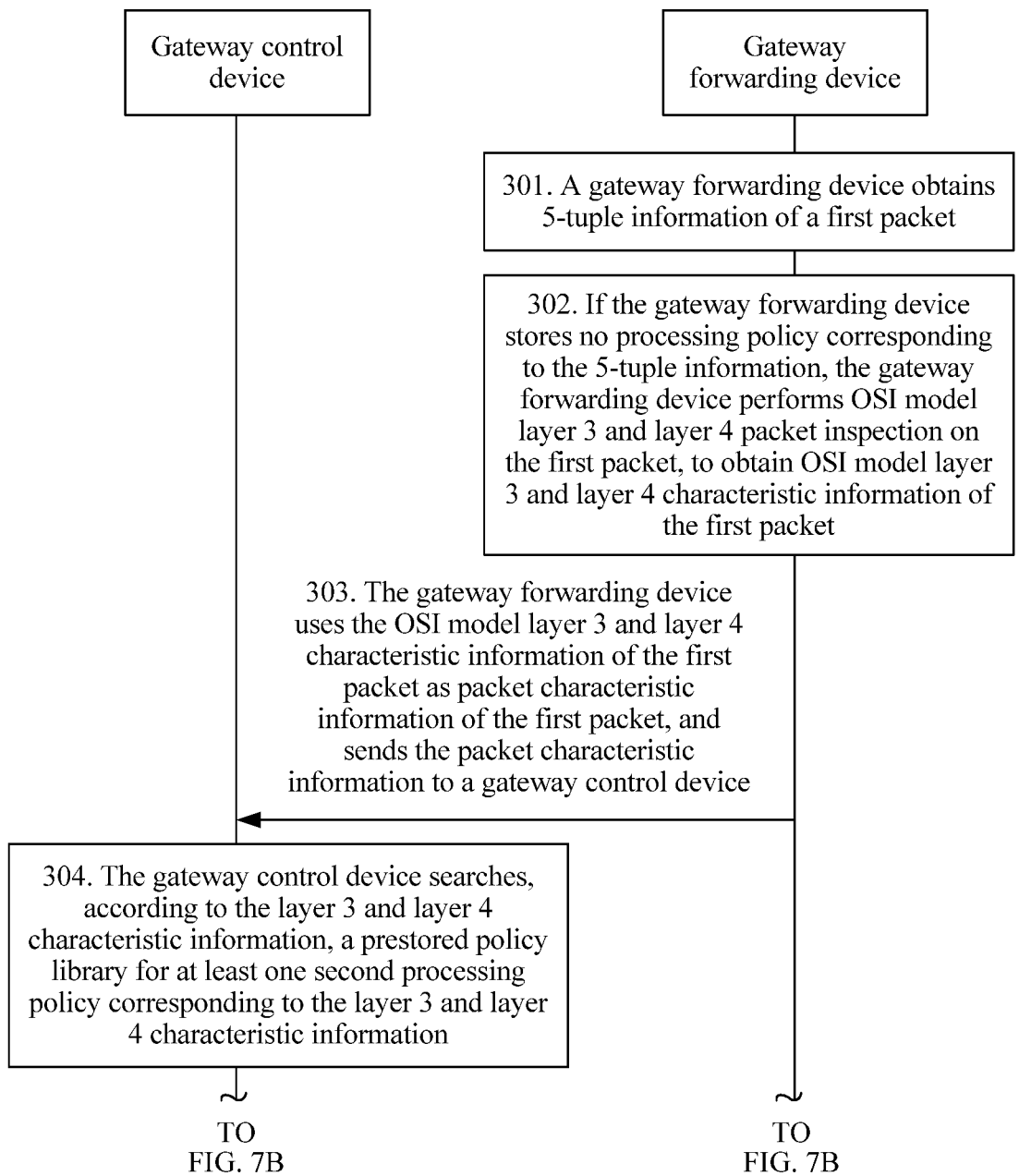
FIG. 7A and FIG. 7B are first schematic interaction diagrams of a packet processing method according to an embodiment of the present disclosure.
Figure 7B:
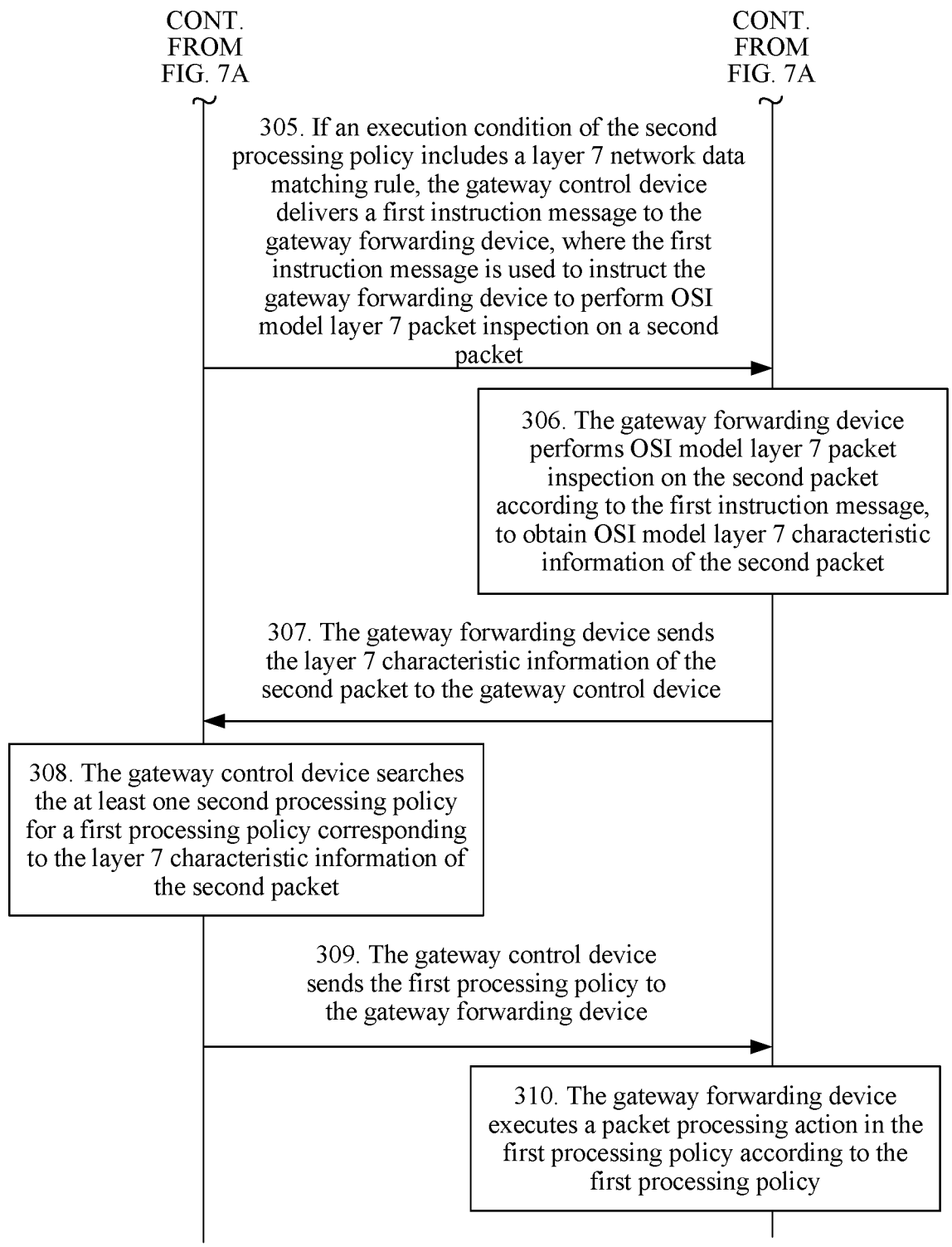

Based on a forwarding model between a gateway forwarding device and a gateway control device shown in FIG. 4, as shown in FIG. 7A and FIG. 7B, this embodiment of the present disclosure provides a packet processing method. Packet characteristic information of a first packet includes Layer 3 and layer 4 characteristic information of the first packet of OSI model. The method includes the following steps.

301. A gateway forwarding device obtains 5-tuple information of a first packet.

302. If the gateway forwarding device stores no processing policy corresponding to the 5-tuple information, the gateway forwarding device performs Layer 3 and layer 4 packet inspection in OSI model on the first packet, to obtain layer 3 and layer 4 characteristic information of the first packet of OSI model.

303. The gateway forwarding device uses the Layer 3 and layer 4 characteristic information of the first packet of OSI model as packet characteristic information of the first packet, and sends the packet characteristic information to a gateway control device.

304. The gateway control device searches, according to the layer 3 and layer 4 characteristic information, a prestored policy library for at least one second processing policy corresponding to the layer 3 and layer 4 characteristic information.

305. If an execution condition of the second processing policy includes a layer 7 network data matching rule, the gateway control device delivers a first instruction message to the gateway forwarding device, where the first instruction message is used to instruct the gateway forwarding device to perform Layer 7 packet inspection of OSI model on a second packet.

306. The gateway forwarding device performs Layer 7 packet inspection of OSI model on a second packet according to the first instruction message, to obtain Layer 7 characteristic information of the second packet of OSI model.

307. The gateway forwarding device sends the layer 7 characteristic information of the second packet to the gateway control device.

308. The gateway control device searches the at least one second processing policy for a first processing policy corresponding to the layer 7 characteristic information of the second packet.

309. The gateway control device sends the first processing policy to the gateway forwarding device.

310. The gateway forwarding device executes a packet processing action in the first processing policy according to the first processing policy.

In step 301, the gateway forwarding device may receive, by using an interface such as an S5/S8 interface, the first packet sent by another network entity, and perform header inspection on the first packet, to obtain the 5-tuple information of the first packet, that is, a source IP address, a source port, a destination IP address, a destination port, and a transport layer protocol of the first packet.

In step 302, if the gateway forwarding device stores no processing policy corresponding to the 5-tuple information, for example, executing a QoS (quality of service) control action, a charging action, or a service control action, the gateway forwarding device performs Layer 3 and layer 4 packet inspection in OSI model on the first packet, to obtain the OSI model layer 3 and layer 4 characteristic information (for example, the 5-tuple information and a source DSCP of the first packet) of the first packet.

In step 303, the gateway forwarding device encapsulates the Layer 3 and layer 4 characteristic information of the first packet of OSI model as an interface type message (for example, a packet identify report) between the gateway control device and the gateway forwarding device, and sends the interface type message to the gateway control device by using an S18 interface.

In addition, the gateway forwarding device buffers the first packet in a storage unit in the gateway forwarding device. In this way, if the gateway forwarding device subsequently receives an instruction message of performing layer 7 packet inspection, the gateway forwarding device may obtain the first packet from the storage unit, to perform layer 7 packet inspection on the first packet.

In step 304, the gateway control device searches, according to the layer 3 and layer 4 characteristic information received in step 303, the prestored policy library for the second processing policy corresponding to the layer 3 and layer 4 characteristic information. There may be a plurality of second processing policies.

For a method in which the gateway control device searches the prestored policy library for the second processing policy corresponding to the layer 3 and layer 4 characteristic information, refer to steps 101 to 103 in the foregoing embodiment. Therefore, details are not described herein.

In step 305, referring to Table 1, if the execution condition of the second processing policy found in step 304 includes the OSI model layer 7 network data matching rule (that is, L7 protocol) of the first packet, the gateway control device delivers the first instruction message (for example, a packet identify request) to the gateway forwarding device. The first instruction message is used to instruct the gateway forwarding device to perform OSI model layer 7 DPI (deep packet inspection) on the received second packet. The second packet is a packet having same 5-tuple information as the first packet.

The first instruction message carries the 5-tuple information of the first packet and a quantity of inspection times of performing layer 7 DPI. The gateway control device sends the first instruction message to the gateway forwarding device by using the S18 interface.

In addition, if the execution condition of the second processing policy found in step 304 does not include the OSI model layer 7 network data matching rule of the first packet, it indicates that the second processing policy corresponding to the layer 3 and layer 4 characteristic information matches the first packet. In this case, the gateway control device may determine, as the first processing policy, a processing policy that has a highest priority in the at least one second processing policy; and encapsulate a set of packet processing actions (for example, QoS control, charging, and service control) corresponding to the first processing policy, and send an encapsulated set of packet processing actions to the gateway forwarding device by using the S18 interface.

In step 306, the gateway forwarding device performs Layer 7 packet inspection of OSI model (for example, DPI) on the second packet according to the first instruction message (for example, a packet identify request) in step 305, to obtain the OSI model layer 7 characteristic information of the second packet.

Specifically, the quantity of inspection times that is carried in the first instruction message is a quantity of attempts to perform DPI on the subsequent second packet whose 5-tuple information is the same as the 5-tuple information. Based on the 5-tuple information carried in the first instruction message, DPI is performed on the received second packet whose 5-tuple information is the same as the 5-tuple information.

First, after performing DPI on the buffered first packet, the gateway forwarding device may obtain partial layer 7 characteristic information of the first packet, and subsequently perform DPI once each time the gateway forwarding device receives a second packet whose 5-tuple information is the same as the 5-tuple information. The second packet may be buffered in the gateway forwarding device, and a quantity of inspection times is limited to the quantity of inspection times that is carried in the first instruction message.

Further, in step 307, the gateway forwarding device uses, as the layer 7 characteristic information, content (for example, L7 protocol, URL, Method, or User-Agent) obtained after each time of DPI, encapsulates the layer 7 characteristic information as an interface message (for example, a packet identify report), and sends the interface message to the gateway control device. If the inspection still does not succeed after the limited quantity of inspection times, content (for example, L7 protocol) that has been obtained by means of inspection and an inspection failure indication are used as the layer 7 characteristic information, and the layer 7 characteristic information is sent to the gateway control device.

In step 308, the gateway control device searches the policy library for the first processing policy corresponding to all of the layer 3, layer 4, and layer 7 characteristic information.

Specifically, the gateway control device receives, by using the S18 interface, the layer 7 characteristic information sent by the gateway forwarding device. If the inspection succeeds, the gateway control device determines, from the found at least one second processing policy according to the layer 7 characteristic information, the first processing policy that meets the execution condition.

If the layer 7 characteristic information indicates that the layer 7 packet inspection fails, the gateway forwarding device determines the first processing policy from the matched at least one second processing policy in descending order of priorities according to the existing layer 7 characteristic information.

Then, in step 309, the gateway control device encapsulates the first processing policy as an interface message (for example, a flow action indication) between the gateway control device and the gateway forwarding device, where the interface message further carries the 5-tuple information of the first packet and an ID of the packet processing action in the first processing policy; and sends the interface message to the gateway forwarding device.

In step 310, the gateway forwarding device receives, by using the S18 interface, the first processing policy delivered by the gateway control device. In this case, the gateway forwarding device binds the first processing policy to the 5-tuple information of the first packet for saving, and executes the packet processing action in the first processing policy on a packet whose 5-tuple information is the same as the 5-tuple information currently buffered by the gateway forwarding device.

When receiving a third packet having same 5-tuple information as the first packet, the gateway forwarding device only needs to search the gateway forwarding device for the first processing policy bound to the 5-tuple information, and then executes the packet processing action in the first processing policy on the third packet.

In addition, this embodiment of the present disclosure further provides a packet processing method in which steps are similar to steps 301 to 310. A difference is as follows: When performing step 303, the gateway forwarding device may further send the received first packet to the gateway control device, that is, when performing step 303, the gateway forwarding device sends both the first packet and the Layer 3 and layer 4 characteristic information of the first packet of OSI model to the gateway control device, and the gateway forwarding device does not need to buffer the first packet in the storage unit in the gateway forwarding device.

Similarly, in this implementation, the gateway forwarding device forwards, to the gateway control device, all received packets having same 5-tuple information as the first packet, and the gateway forwarding device does not need to perform a buffering operation.

At this point, according to the packet processing method provided in this embodiment of the present disclosure, the gateway forwarding device obtains the packet characteristic information of the first packet after performing packet inspection on the received first packet, and sends the packet characteristic information to the gateway control device. The gateway control device searches, according to the packet characteristic information of the first packet, the prestored policy library for the first processing policy corresponding to the packet characteristic information, and then sends the first processing policy to the gateway forwarding device, so that the gateway forwarding device executes the packet processing action in the first processing policy on the first packet. In this way, the gateway control device is configured to implement a function of a gateway control plane, and the gateway forwarding device is configured to implement a function of a gateway forwarding plane. No gateway forwarding device needs to store a policy library. Instead, the gateway control device centrally matches different processing policies in the preset policy library for various packets. Therefore, work such as configuration, updating, and maintenance needs to be performed only on the policy library in the gateway control device, and network operation and maintenance costs are greatly reduced.

Embodiment 3

Figure 8:
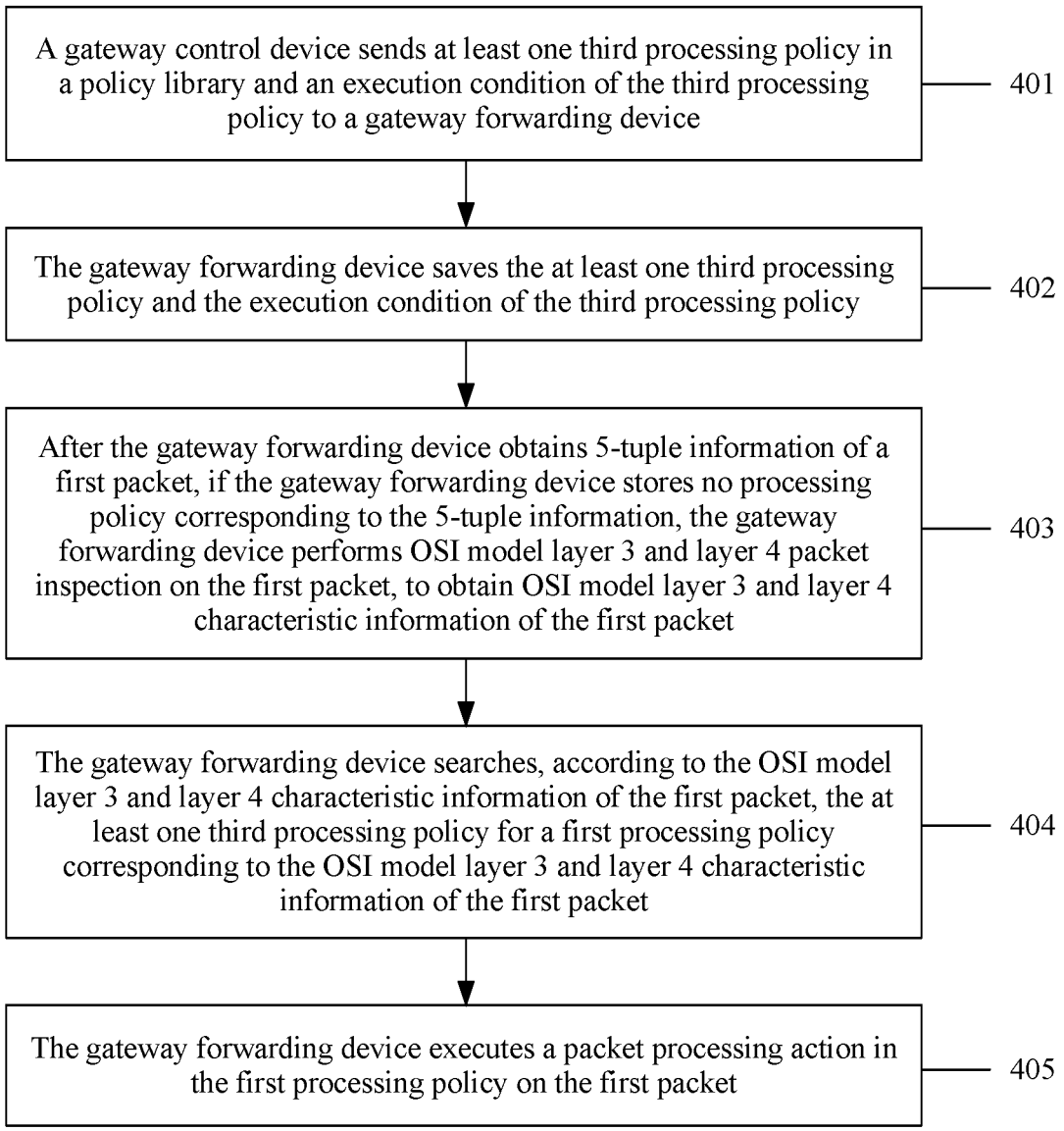
FIG. 8 is a third schematic flowchart of a packet processing method according to an embodiment of the present disclosure.

Based on a forwarding model between a gateway forwarding device and a gateway control device shown in FIG. 5, before step 303 in Embodiment 2 is performed, as shown in FIG. 8, a packet exchange method between the gateways may further include the following steps 401 to 405:

401. A gateway control device sends at least one third processing policy in a policy library and an execution condition of the third processing policy to a gateway forwarding device.

402. The gateway forwarding device saves the at least one third processing policy and the execution condition of the third processing policy.

403. After the gateway forwarding device obtains 5-tuple information of a first packet, if the gateway forwarding device stores no processing policy corresponding to the 5-tuple information, the gateway forwarding device performs Layer 3 and layer 4 packet inspection in OSI model on the first packet, to obtain layer 3 and layer 4 characteristic information of the first packet of OSI model.

404. The gateway forwarding device searches, according to the Layer 3 and layer 4 characteristic information of the first packet of OSI model, the at least one third processing policy for a first processing policy corresponding to the Layer 3 and layer 4 characteristic information of the first packet of OSI model.

405. The gateway forwarding device executes a packet processing action in the first processing policy on the first packet.

In step 401, the gateway control device establishes a PDN connection after receiving a create session request from the outside (for example, after receiving a create session message from an MME). In this case, the gateway control device delivers a session management message (for example, a session management request) to the gateway forwarding device, and may add the at least one third processing policy in the policy library and the execution condition of the third processing policy into the session management message.

The third processing policy may be a processing policy that has a relatively high priority and that is corresponding to the layer 3 and layer 4 characteristic information. In this case, the execution condition of the third processing policy includes only a layer 3 and layer 4 execution condition Certainly, the gateway control device may independently create a service flow control message (for example, a flow action indication); add the at least one third processing policy in the policy library and the execution condition of the third processing policy into the service flow control message; and send the service flow control message to the gateway forwarding device.

In step 402, the gateway forwarding device receives the session management message (for example, a session management request) or the created service flow control message (for example, a flow action indication) that is sent by the gateway control device, and saves the third processing policy and the execution condition of the third processing policy that are carried in the message.

In step 403, after the gateway forwarding device obtains the 5-tuple information of the first packet, if the gateway forwarding device stores no processing policy corresponding to the 5-tuple information, the gateway forwarding device performs Layer 3 and layer 4 packet inspection in OSI model on the first packet, to obtain the Layer 3 and layer 4 characteristic information of the first packet of OSI model.

Then, in step 404, because the gateway forwarding device stores the third processing policy and the execution condition of the third processing policy, that is, the gateway forwarding device stores a small policy library, the gateway forwarding device may search, according to the OSI model layer 3 and layer 4 characteristic information that is of the first packet and that is obtained in step 403, the small policy library for the first processing policy corresponding to the Layer 3 and layer 4 characteristic information of the first packet of OSI model.

Correspondingly, because the third processing policy stored in the gateway forwarding device is only a part of the policy library in the gateway control device, the gateway forwarding device may fail to find, from the small policy library, the second processing policy corresponding to the Layer 3 and layer 4 characteristic information of the first packet of OSI model. In this case, the gateway forwarding device and the gateway control device perform subsequent steps according to steps 303 to 310 in the packet exchange method in Embodiment 2. Details are not described herein again.

Certainly, in step 405, if the gateway forwarding device finds, from the small policy library, the second processing policy corresponding to the Layer 3 and layer 4 characteristic information of the first packet of OSI model, the gateway forwarding device executes the packet processing action in the first processing policy on the first packet according to an ID of the packet processing action in the first processing policy.

At this point, according to the packet processing method provided in this embodiment of the present disclosure, the gateway forwarding device obtains the packet characteristic information of the first packet after performing packet inspection on the received first packet, and sends the packet characteristic information to the gateway control device. The gateway control device searches, according to the packet characteristic information of the first packet, the prestored policy library for the first processing policy corresponding to the packet characteristic information, and then sends the first processing policy to the gateway forwarding device, so that the gateway forwarding device executes the packet processing action in the first processing policy on the first packet. In this way, the gateway control device is configured to implement a function of a gateway control plane, and the gateway forwarding device is configured to implement a function of a gateway forwarding plane. No gateway forwarding device needs to store a policy library. Instead, the gateway control device centrally matches different processing policies in the preset policy library for various packets. Therefore, work such as configuration, updating, and maintenance needs to be performed only on the policy library in the gateway control device, and network operation and maintenance costs are greatly reduced.

Embodiment 4

Figure 9A:
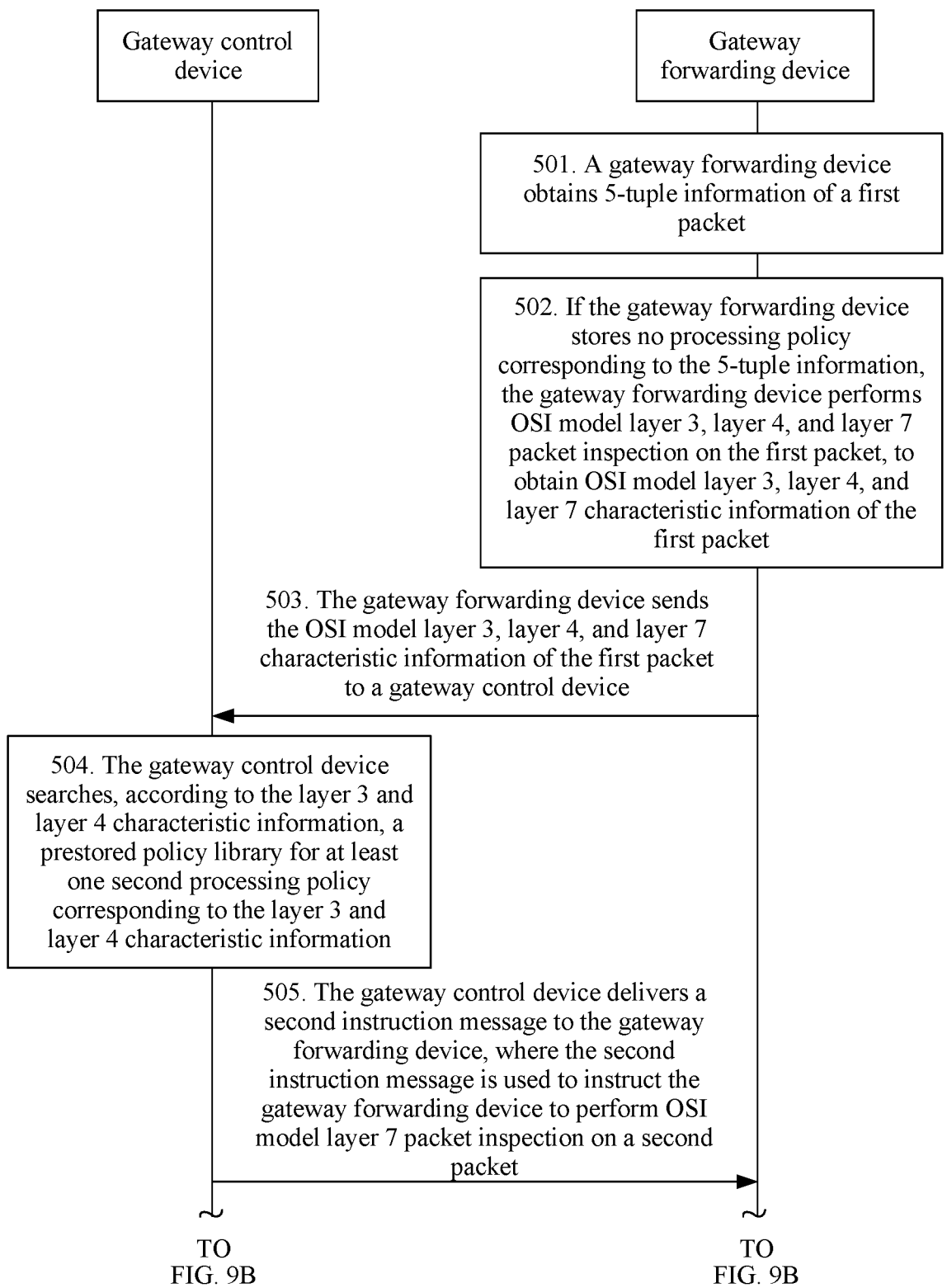
FIG. 9A and FIG. 9B are second schematic interaction diagrams of a packet processing method according to an embodiment of the present disclosure.
Figure 9B:
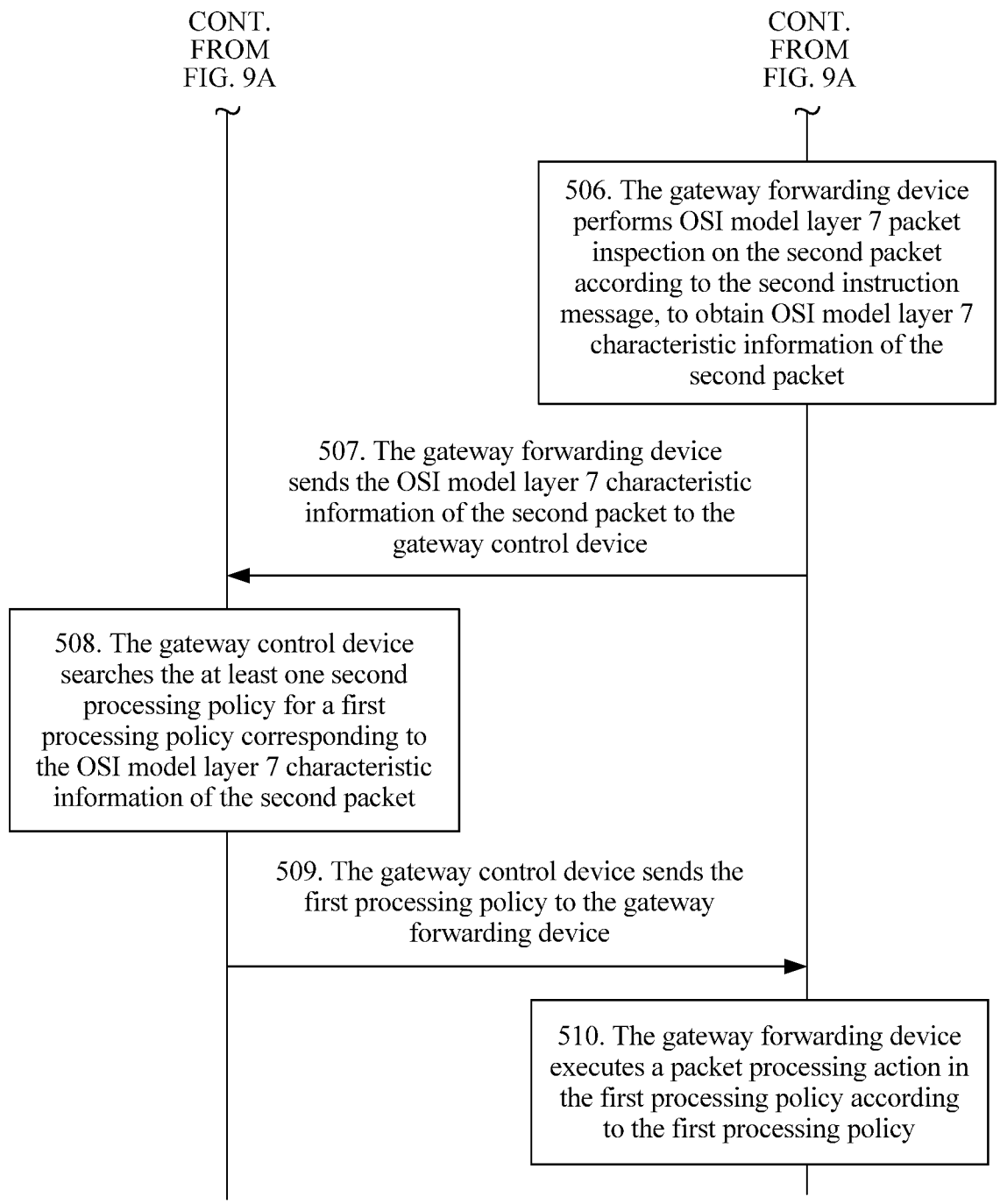

Based on a forwarding model between a gateway forwarding device and a gateway control device shown in FIG. 4, as shown in FIG. 9A and FIG. 9B, this embodiment of the present disclosure provides a packet processing method. Packet characteristic information of a first packet includes Layer 3, layer 4, and layer 7 characteristic information of the first packet of OSI model. The method includes the following steps.

501. A gateway forwarding device obtains 5-tuple information of a first packet.

502. If the gateway forwarding device stores no processing policy corresponding to the 5-tuple information, the gateway forwarding device performs Layer 3, layer 4, and layer 7 packet inspection of OSI model on the first packet, to obtain Layer 3, layer 4, and layer 7 characteristic information of the first packet of OSI model.

503. The gateway forwarding device sends the Layer 3, layer 4, and layer 7 characteristic information of the first packet of OSI model to a gateway control device.

504. The gateway control device searches, according to the layer 3 and layer 4 characteristic information, a prestored policy library for at least one second processing policy corresponding to the layer 3 and layer 4 characteristic information.

505. The gateway control device delivers a second instruction message to the gateway forwarding device, where the second instruction message is used to instruct the gateway forwarding device to perform Layer 7 packet inspection of OSI model on a second packet.

506. The gateway forwarding device performs Layer 7 packet inspection of OSI model on a second packet according to the second instruction message, to obtain Layer 7 characteristic information of the second packet of OSI model.

507. The gateway forwarding device sends the Layer 7 characteristic information of the second packet of OSI model to the gateway control device.

508. The gateway control device searches the at least one second processing policy for a first processing policy corresponding to the Layer 7 characteristic information of the second packet of OSI model.

509. The gateway control device sends the first processing policy to the gateway forwarding device.

510. The gateway forwarding device executes a packet processing action in the first processing policy according to the first processing policy.

In step 501, for a specific method in which the gateway forwarding device obtains the 5-tuple information of the first packet, refer to the detailed description of step 301.

In step 502, if the gateway forwarding device stores no processing policy (for example, executing a QoS control action, a charging action, or a service control action) corresponding to the 5-tuple information, the gateway forwarding device performs OSI model layer 3 and layer 4 SPI on the first packet, to obtain the OSI model layer 3 and layer 4 characteristic information (for example, a source DSCP of the first packet) of the first packet.

In addition, in step 502, the gateway forwarding device further performs OSI model layer 7 DPI on the first packet, to obtain the OSI model layer 7 characteristic information (for example, L7 protocol, URL, Method, or User-Agent) of the first packet.

In step 503, the gateway forwarding device encapsulates the Layer 3, layer 4, and layer 7 characteristic information of the first packet of OSI model as an interface type message (for example, a packet identify report) between the gateway control device and the gateway forwarding device, and sends the interface type message to the gateway control device by using an S18 interface.

In step 504, the gateway control device searches, according to the layer 3 and layer 4 characteristic information, the prestored policy library for the at least one second processing policy corresponding to the layer 3 and layer 4 characteristic information.

In this case, if an execution condition of the second processing policy includes the L7 protocol (that is, a matching rule for network data of OSI model), after step 504, the gateway control device may further search, according to the OSI model layer 7 characteristic information that is of the first packet and that is obtained in step 502, the second processing policy for a first processing policy corresponding to the OSI model layer 7 characteristic information of the first packet.

Alternatively, in step 502, after performing OSI model layer 7 DPI on the first packet, the gateway forwarding device may obtain only partial OSI model layer 7 characteristic information of the first packet. Therefore, the gateway control device cannot find, from the second processing policy, a first processing policy corresponding to the layer 7 characteristic information of the first packet.

In this case, the gateway control device performs step 505, that is, delivers the second instruction message to the gateway forwarding device. The second instruction message is used to instruct the gateway forwarding device to perform Layer 7 packet inspection of OSI model on the received second packet. The second packet is a packet having same 5-tuple information as the first packet.

The second instruction message carries the 5-tuple information of the first packet and a quantity of inspection times of performing layer 7 DPI. The gateway control device sends the second instruction message to the gateway forwarding device by using the S18 interface.

Further, in step 506, the gateway forwarding device performs Layer 7 packet inspection of OSI model on a second packet according to the second instruction message (for example, a packet identify request), to obtain the Layer 7 characteristic information of the second packet of OSI model.

For example, after performing DPI on the buffered first packet, the gateway forwarding device may obtain partial layer 7 characteristic information of the first packet, and subsequently perform DPI once each time the gateway forwarding device receives a second packet whose 5-tuple information is the same as the 5-tuple information. The second packet may be buffered in the gateway forwarding device, and a quantity of inspection times is limited to the quantity of inspection times that is carried in the second instruction message. In this way, the gateway forwarding device uses, as the layer 7 characteristic information, content (for example, L7 protocol, URL, Method, or User-Agent) obtained after each time of DPI.

Further, for detailed descriptions of the subsequent steps 507 to 510, refer to the detailed descriptions of steps 307 to 310 in Embodiment 2. Therefore, details are not described herein.

At this point, according to the packet processing method provided in this embodiment of the present disclosure, the gateway forwarding device obtains the packet characteristic information of the first packet after performing packet inspection on the received first packet, and sends the packet characteristic information to the gateway control device. The gateway control device searches, according to the packet characteristic information of the first packet, the prestored policy library for the first processing policy corresponding to the packet characteristic information, and then sends the first processing policy to the gateway forwarding device, so that the gateway forwarding device executes the packet processing action in the first processing policy on the first packet. In this way, the gateway control device is configured to implement a function of a gateway control plane, and the gateway forwarding device is configured to implement a function of a gateway forwarding plane. No gateway forwarding device needs to store a policy library. Instead, the gateway control device centrally matches different processing policies in the preset policy library for various packets. Therefore, work such as configuration, updating, and maintenance needs to be performed only on the policy library in the gateway control device, and network operation and maintenance costs are greatly reduced.

Embodiment 5

Figure 10:
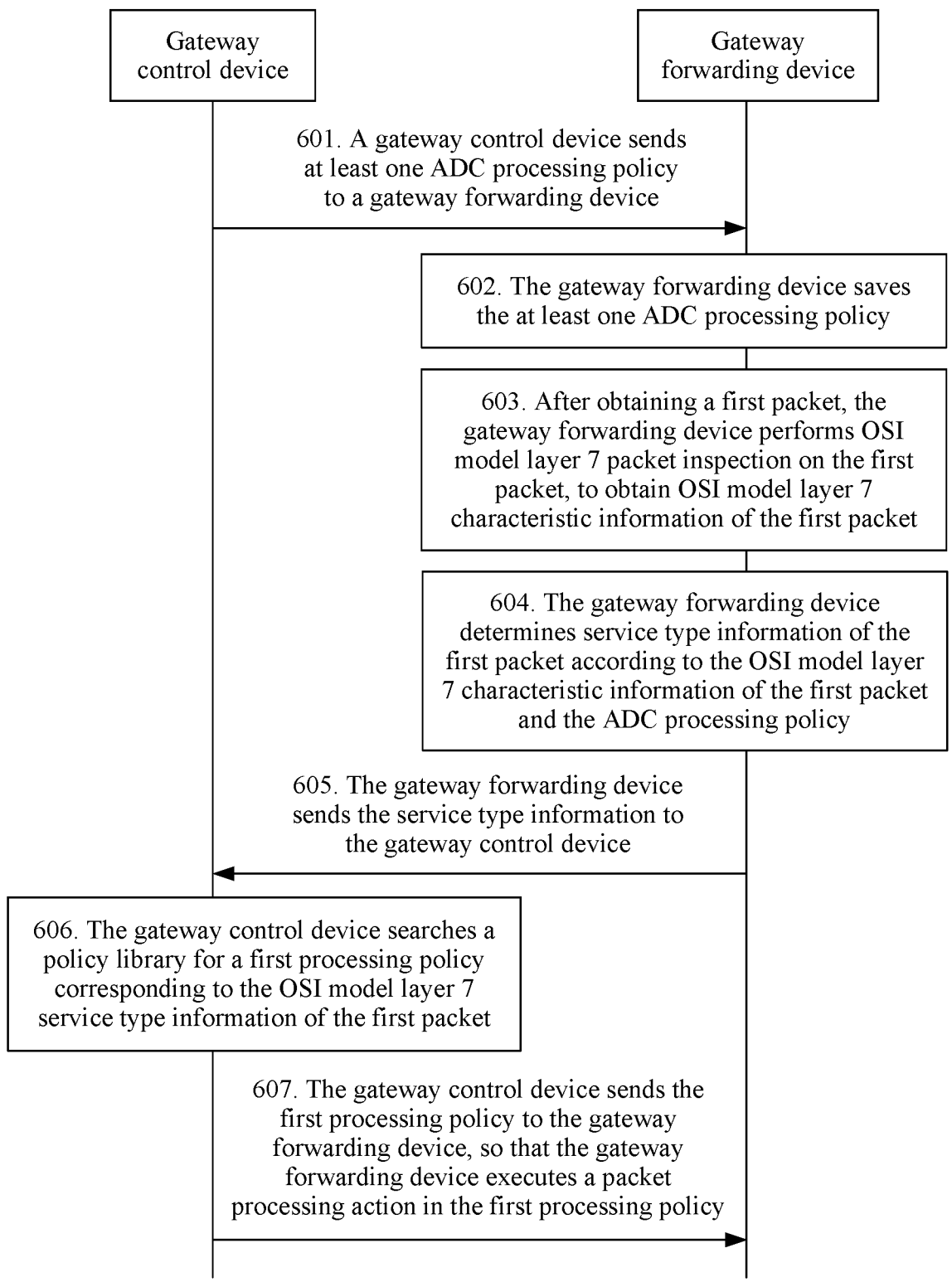
FIG. 10 is a third schematic interaction diagram of a packet processing method according to an embodiment of the present disclosure.

Based on a forwarding model between a gateway forwarding device and a gateway control device shown in FIG. 5, as shown in FIG. 10, this embodiment of the present disclosure provides a packet processing method. Packet characteristic information of a first packet includes OSI model layer 7 service type information of the first packet. The method includes the following steps:

601. A gateway control device sends at least one ADC processing policy to a gateway forwarding device.

602. The gateway forwarding device saves the at least one ADC processing policy.

603. After obtaining a first packet, the gateway forwarding device performs Layer 7 packet inspection of OSI model on the first packet, to obtain layer 7 characteristic information of the first packet of OSI model.

604. The gateway forwarding device determines service type information of the first packet according to the OSI model layer 7 characteristic information of the first packet and the ADC processing policy.

605. The gateway forwarding device sends the service type information to the gateway control device.

606. The gateway control device searches a policy library for a first processing policy corresponding to the OSI model layer 7 service type information of the first packet.

607. The gateway control device sends the first processing policy to the gateway forwarding device, so that the gateway forwarding device executes a packet processing action in the first processing policy.

In step 601, the gateway control device establishes a PDN connection after receiving a create session request from the outside (for example, after receiving a create session message from an MME). In this case, the gateway control device delivers a session management message (for example, a session management request) to the gateway forwarding device, and may add the at least one ADC (application detection and control) processing policy into the session management message.

Certainly, the gateway control device may independently create a service flow control message (for example, a flow action indication); add the ADC processing policy into the service flow control message; and send the service flow control message to the gateway forwarding device.

In step 602, the gateway forwarding device receives the session management message (for example, a session management request) or the created service flow control message (for example, a flow action indication) that is sent by the gateway control device, and saves the ADC processing policy carried in the message.

In step 603, after obtaining the first packet, the gateway forwarding device may perform Layer 7 packet inspection of OSI model on the first packet, to obtain the OSI model layer 7 characteristic information of the first packet.

In this case, in step 604, the gateway forwarding device matches the OSI model layer 7 characteristic information of the first packet against the locally-stored ADC processing policy. If the matching succeeds, the gateway forwarding device may determine the service type information (for example, a BitTorrent service) of the first packet.

Further, the gateway forwarding device may create a service type matching event message (for example, an application type report), where the service type matching event message may carry the service type information of the first packet and 5-tuple information of the first packet; and send the service type matching event message to the gateway control device.

Alternatively, in addition to sending the service type information to the gateway control device, the gateway forwarding device may further report an ID of a matched ADC processing policy to the gateway control device.

In step 605, after receiving the service type matching event message (for example, an application type report) by using an S18 interface, the gateway control device further searches, based on the service type information (for example, BitTorrent service) carried in the service type matching event message, the policy library for the first processing policy for processing a packet of this service type.

Finally, in step 606, the gateway control device encapsulates the first processing policy as an interface message (for example, a flow action indication) between the gateway control device and the gateway forwarding device, and sends the interface message to the gateway forwarding device. In this way, the gateway forwarding device receives, by using the S18 interface, the first processing policy delivered by the gateway control device; binds the first processing policy to the 5-tuple information of the first packet for saving; and executes the packet processing action in the first processing policy on a packet whose 5-tuple information is the same as the 5-tuple information currently buffered by the gateway forwarding device.

When receiving a third packet having same 5-tuple information as the first packet, the gateway forwarding device only needs to search the gateway forwarding device for the first processing policy bound to the 5-tuple information, and then executes the packet processing action in the first processing policy on the third packet.

At this point, according to the packet processing method provided in this embodiment of the present disclosure, the gateway forwarding device obtains the packet characteristic information of the first packet after performing packet inspection on the received first packet, and sends the packet characteristic information to the gateway control device. The gateway control device searches, according to the packet characteristic information of the first packet, the prestored policy library for the first processing policy corresponding to the packet characteristic information, and then sends the first processing policy to the gateway forwarding device, so that the gateway forwarding device executes the packet processing action in the first processing policy on the first packet. In this way, the gateway control device is configured to implement a function of a gateway control plane, and the gateway forwarding device is configured to implement a function of a gateway forwarding plane. No gateway forwarding device needs to store a policy library. Instead, the gateway control device centrally matches different processing policies in the preset policy library for various packets. Therefore, work such as configuration, updating, and maintenance needs to be performed only on the policy library in the gateway control device, and network operation and maintenance costs are greatly reduced.

Embodiment 6

This embodiment of the present disclosure provides a packet processing method. Different from the methods in Embodiments 1 to 5, in the method, a function of a gateway forwarding device is decomposed based on an object-oriented implementation method, and a forwarding plane is abstracted as a plurality of objects, so that a service is provided, in a form of an object, for sending/receiving a packet. For example, a gateway control device creates different objects for the gateway forwarding device based on different application scenarios, and instructs the gateway forwarding device to instantiate the created objects. This flexible and dynamic definition manner reflects programmability of the gateway forwarding device.

An object is an abstract expression of a type of entity that has a specific function and attribute. The object needs to be instantiated before being used, and the object may be assigned some actions and attributes by means of instantiation. That the gateway control device may instruct the gateway forwarding device to create an object means the gateway control device needs to specify an attribute of the object and an action that the object needs to complete. The attribute is used to describe a characteristic of the object, and the action is used to describe a function of the object.

For example, a packet sending/receiving function may be decomposed into several minimum execution functions, and each minimum execution function may be referred to as an atomic action. In the present disclosure, the gateway forwarding device may include the following objects after abstraction: a bearer object, an SDF (service data flow)/flow object, a UController (forwarding plane control) object, and the like. Certainly, the gateway forwarding device may include another object. This is not limited in the present disclosure.

The bearer object means that flow packets with a same QCI (QoS class identifier) can be converged on one bearer. The bearer object is configured to: perform DPI on a packet with new 5-tuple information, and notify the gateway control device of a result. The flow object/SDF object is an operation object of a flow-granularity-based packet, and the gateway control device may create the flow/SDF object based on the result of the DPI. The flow/SDF object mainly completes processing such as QoS or service control on the packet. The UController object is a control object of the gateway forwarding device, and is configured to receive and process a control message (for example, a message for requesting the gateway forwarding device to perform layer 7 DPI on a packet with specified 5-tuple information) delivered by the gateway control device, or the like.

In this embodiment of the present disclosure, a packet processing procedure executed by the gateway forwarding device may be decomposed into a plurality of minimum actions, and each minimum action is referred to as an atomic action. Information required in a process of executing the atomic action may be obtained from a corresponding object attribute; or may be delivered by the gateway control device to the gateway forwarding device as a parameter of the atomic action.

For example, the gateway control device may orchestrate, into N object sets, a procedure in which the gateway forwarding device processes a first packet. Each object set includes an object and an atomic action set that are required in each procedure in which the gateway forwarding device processes the first packet. Then, the gateway control device sends the N object sets to the gateway forwarding device, so that the gateway forwarding device processes the first packet according to each of the N object sets.

Specifically, the atomic action set may include the following actions: ObjectMatch, that is, querying a flow packet operation rule of the gateway forwarding device according to a match item (for example, 5-tuple information), for example, sending a packet with 5-tuple information to an object, or performing matching for a packet with a 5-tuple according to layer 7 characteristic information; SendPacket, that is, sending, according to a target object (for example, an ID of an instantiated flow object), a packet to the target object for processing; BufferPacket, that is, buffering a packet, for example, buffering, in the gateway forwarding device, a packet received by an object; and the like.

It should be noted that in this embodiment of the present disclosure, an abstraction rule of an object, a quantity of objects, and a name of the object are not limited, an atomic action of the object is not limited, and a name of the atomic action and a function implemented by the atomic action are not limited.

Specifically, the gateway control device may send the N object sets to the gateway forwarding device by using an S18 interface, for example, add the N object sets into a forward management request. Each of the N object sets carries information, such as an object, action, and attribute, that is required when the gateway forwarding device sends/receives a packet (the first packet). In addition, the N object sets may further include orchestration information of all actions, for example, orchestration of actions executed by an object (that is, an execution sequence of corresponding actions of each object), and orchestration of communication between objects (a packet traversing sequence between objects).

Example 1

The following uses the example to describe an implementation that is of the packet processing method shown in FIG. 7A and FIG. 7B in Embodiment 2 and that is obtained after the gateway forwarding device uses the object-oriented implementation method. The implementation includes the following steps.

701. A gateway forwarding device needs to perform Layer 3 and layer 4 packet inspection in OSI model on a received first packet.

In this case, a first object set obtained after a gateway control device performs orchestration is as follows:

Bearer_ObjectMatch>>Bearer_Classify>>Bearer_BufferPacket>>Bearer_EventR eport

An object is a bearer object.

An atomic action set of the bearer object includes the following actions: ObjectMatch, that is, searching for a flow object based on 5-tuple information of the first packet; Classify, that is, performing layer 3 and layer 4 packet inspection on the first packet; BufferPacket, that is, buffering the received first packet; and EventReport, that is, sending, to the gateway control device, a result obtained after layer 3 and layer 4 packet inspection is performed on the first packet.

702. A gateway control device needs to instruct the gateway forwarding device to perform layer 7 packet inspection.

In this case, a second object set obtained after the gateway control device performs orchestration is as follows:

UController_UpdateMatchTbl

An object is a UController object.

An atomic action set of the UController object includes: UpdateMatchTbl, that is, refreshing an action execution list of the first packet corresponding to the 5-tuple information.

703. The gateway forwarding device performs layer 7 packet inspection according to the instruction of the gateway control device.

In this case, a third object set obtained after the gateway control device performs orchestration is the same as the first object set in step 701, and is as follows:

Bearer_ObjectMatch>>Bearer_Classify>>Bearer_Buffer Packet>>Bearer_EventR eport

A difference between the first object set and the third object set is as follows: action information of Classify of the first object set is performing layer 3 and layer 4 packet inspection, while action information of Classify of the third object set is performing layer 7 packet inspection. Actually, the gateway control device needs to deliver only one object set.

704. The gateway control device searches, according to packet inspection results reported by the gateway forwarding device in step 701 and step 703, a prestored policy library for a first processing policy corresponding to the packet inspection results, and instructs the gateway forwarding device to create a flow object corresponding to 5-tuple information of the first packet.

In this case, a fourth object set obtained after the gateway control device performs orchestration is as follows:

UController_CreateObject>>UController_UpdateTbl

An object is a UController object.

An atomic action set of the UController object includes the following actions: CreateObject, that is, creating, based on the first object set sent by the gateway control device, the flow object corresponding to the 5-tuple information; and UpdateMatchTbl, updating a packet processing action that is corresponding to the 5-tuple information and that is stored in the gateway forwarding device.

705. When subsequently receiving a packet corresponding to the 5-tuple information, the gateway forwarding device directly executes a stored packet processing action according to the created flow object.

In this case, a fifth object set obtained after the gateway control device performs orchestration is as follows:

Bearer_ObjectMatch>>Bearer_SendPacket

An object is a bearer object.

An atomic action set of the bearer object includes the following actions: ObjectMatch, that is, querying, according to 5-tuple information of a received packet, a packet processing action corresponding to the packet; and SendPacket, that is, sending the packet.

At this point, the gateway control device adds, into a forward management request, the plurality of object sets obtained after the gateway control device performs orchestration in steps 701 to 705, and delivers the forward management request to the gateway forwarding device, to instruct the gateway forwarding device to create, according to the objects and the atomic action sets that are included in the plurality of object sets, the flow object corresponding to the 5-tuple information of the first packet. When a packet whose 5-tuple information is the same as the 5-tuple information is processed by the created object, an atomic action of the corresponding object is executed, to complete processing of a flow-granularity-based service.

In addition, after receiving the forward management request sent by the gateway control device, the gateway forwarding device returns a response message (for example, a flow management response) to the gateway control device, so that the gateway control device determines that the gateway forwarding device can perform packet processing according to the received plurality of object sets.

Example 2

The following uses the example to describe an implementation that is of the packet processing method shown in FIG. 9A and FIG. 9B in Embodiment 4 and that is obtained after the gateway forwarding device uses the object-oriented implementation method. The implementation includes the following steps.

801. A gateway forwarding device needs to perform Layer 3, layer 4, and layer 7 packet inspection of OSI model on a received first packet.

In this case, a first object set obtained after a gateway control device performs orchestration is as follows:
Bearer_ObjectMatch>>Bearer_Classify>>Bearer_Buffer Packet>>Bearer_EventR eport An object is a bearer object.

An atomic action set of the bearer object includes the following actions: ObjectMatch, that is, searching for a flow object based on 5-tuple information of the first packet; Classify, that is, performing layer 3 and layer 4 packet inspection (for example, SPI) on the first packet, and performing layer 7 packet inspection (for example, DPI) on the first packet; BufferPacket, buffering the received first packet; and EventReport, that is, sending, to the gateway control device, results obtained after layer 3, layer 4, and layer 7 packet inspection are performed on the first packet.

802. A gateway control device needs to instruct the gateway forwarding device to perform layer 7 packet inspection.

In this case, a second object set obtained after the gateway control device performs orchestration is as follows:
UController_UpdateMatchTbl An object is a UController object.

An atomic action set of the UController object includes: UpdateMatchTbl, that is, refreshing an action execution list (for example, a quantity of inspection times of performing layer 7 packet inspection) of the first packet corresponding to the 5-tuple information.

803. The gateway forwarding device continues to perform layer 7 packet inspection according to the instruction of the gateway control device.

In this case, a third object set obtained after the gateway control device performs orchestration is the same as the first object set in step 801, and is as follows:
Bearer_ObjectMatch>>Bearer_Classify>>Bearer_Buffer Packet>>Bearer_EventR eport

804. The gateway control device searches, according to packet inspection results reported by the gateway forwarding device in step 801 and step 803, a prestored policy library for a first processing policy corresponding to the packet inspection results, and instructs the gateway forwarding device to create a flow object corresponding to 5-tuple information of the first packet.

In this case, a fourth object set obtained after the gateway control device performs orchestration is as follows:
UController_CreateObject>>UController_UpdateTbl An object is a UController object.

An atomic action set of the UController object includes the following actions: CreateObject, that is, creating, based on the first object set sent by the gateway control device, the flow object corresponding to the 5-tuple information; and UpdateMatchTbl, updating a packet processing action that is corresponding to the 5-tuple information and that is stored in the gateway forwarding device.

805. When subsequently receiving a packet corresponding to the 5-tuple information, the gateway forwarding device directly executes a stored packet processing action according to the created flow object.

In this case, a fifth object set obtained after the gateway control device performs orchestration is as follows:
Bearer_ObjectMatch>>Bearer_SendPacket An object is a bearer object.

An atomic action set of the bearer object includes the following actions: ObjectMatch, that is, querying, according to 5-tuple information of a received packet, a packet processing action corresponding to the packet; and SendPacket, that is, sending the packet.

Example 3

The following uses the example to describe an implementation that is of the packet processing method shown in FIG. 10 in Embodiment 5 and that is obtained after the gateway forwarding device uses the object-oriented implementation method. The implementation includes the following steps.

901. A gateway forwarding device needs to perform Layer 7 packet inspection of OSI model on a received first packet.

In this case, a first object set obtained after a gateway control device performs orchestration is as follows:
Bearer_ObjectMatch>>Bearer_Classify>>Bearer_Local RuleMatch>>Bearer_BufferPacket>>Bearer_EventReport An object is a bearer object.

An atomic action set of the bearer object includes the following actions: ObjectMatch, that is, searching for a flow object based on 5-tuple information of the first packet; Classify, that is, performing layer 7 packet inspection (for example, DPI) on the first packet; LocalRuleMatch, that is, matching service type information identified based on the Classify action against at least one ADC processing policy stored in the gateway forwarding device; BufferPacket, that is, buffering the received first packet; and EventReport, sending, to the gateway control device, the service type information obtained after layer 7 packet inspection is performed on the first packet.

902. A gateway control device searches, according to service type information reported by the gateway forwarding device in step 901, a prestored policy library for a first processing policy corresponding to the service type information, and instructs the gateway forwarding device to create a flow object corresponding to the 5-tuple information.

In this case, a second object set obtained after the gateway control device performs orchestration is as follows:

UController_CreateObject>>UController_UpdateTbl

An object is a UController object.

An atomic action set of the UController object includes the following actions: CreateObject, that is, creating, based on the first object set sent by the gateway control device, the flow object corresponding to 5-tuple information of the first packet; and UpdateMatchTbl, updating a packet processing action that is corresponding to the 5-tuple information and that is stored in the gateway forwarding device.

903. When subsequently receiving a packet corresponding to the 5-tuple information, the gateway forwarding device directly executes a stored packet processing action according to the created flow object.

In this case, a third object set obtained after the gateway control device performs orchestration is as follows:

Bearer_ObjectMatch>>Bearer_SendPacket

An object is a bearer object.

An atomic action set of the bearer object includes the following actions: ObjectMatch, that is, querying, according to 5-tuple information of a received packet, a packet processing action corresponding to the packet; and SendPacket, that is, sending the packet.

At this point, according to the packet processing method provided in this embodiment of the present disclosure, the gateway forwarding device obtains the packet characteristic information of the first packet after performing packet inspection on the received first packet, and sends the packet characteristic information to the gateway control device. The gateway control device searches, according to the packet characteristic information of the first packet, the prestored policy library for the first processing policy corresponding to the packet characteristic information, and then sends the first processing policy to the gateway forwarding device, so that the gateway forwarding device executes the packet processing action in the first processing policy on the first packet. In this way, the gateway control device is configured to implement a function of a gateway control plane, and the gateway forwarding device is configured to implement a function of a gateway forwarding plane. No gateway forwarding device needs to store a policy library. Instead, the gateway control device centrally matches different processing policies in the preset policy library for various packets. Therefore, work such as configuration, updating, and maintenance needs to be performed only on the policy library in the gateway control device, and network operation and maintenance costs are greatly reduced.

Embodiment 7

Figure 11:
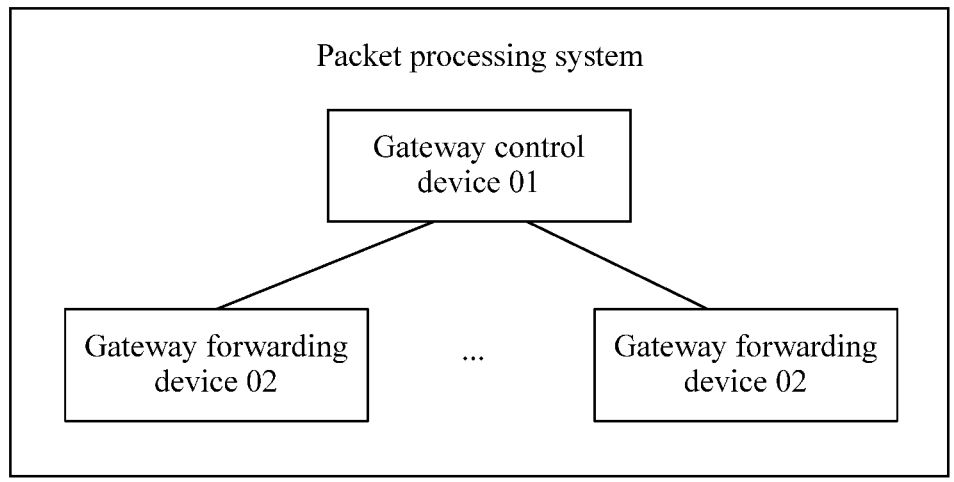
FIG. 11 is an architectural diagram of a packet processing system according to an embodiment of the present disclosure.

FIG. 11 is a schematic architectural diagram of a packet processing system according to an embodiment of the present disclosure. The packet processing system includes a gateway control device 01 and at least one gateway forwarding device 02 connected to the gateway control device 01.

For details, refer to FIG. 1 to FIG. 10 and the detailed descriptions of the packet processing method in Embodiments 1 to 6. All gateway forwarding devices 02 perform packet inspection on various received packets, and then report packet inspection results to the gateway control device 01. The gateway control device 01 centrally matches different processing policies in a preset policy library for the various packets based on the packet inspection results, and delivers a matched processing policy to a corresponding gateway forwarding device 02, so that the gateway forwarding device 02 executes a packet processing action in the processing policy.

It can be learned that no gateway forwarding device 02 needs to store a policy library. Instead, the gateway control device 01 centrally matches different processing policies in the preset policy library for various packets. Therefore, work such as configuration, updating, and maintenance needs to be performed only on the policy library in the gateway control device 01, and network operation and maintenance costs are greatly reduced.

The following describes in detail hardware structures of the gateway control device 01 and the gateway forwarding device 02 in the packet processing system.

Figure 12:
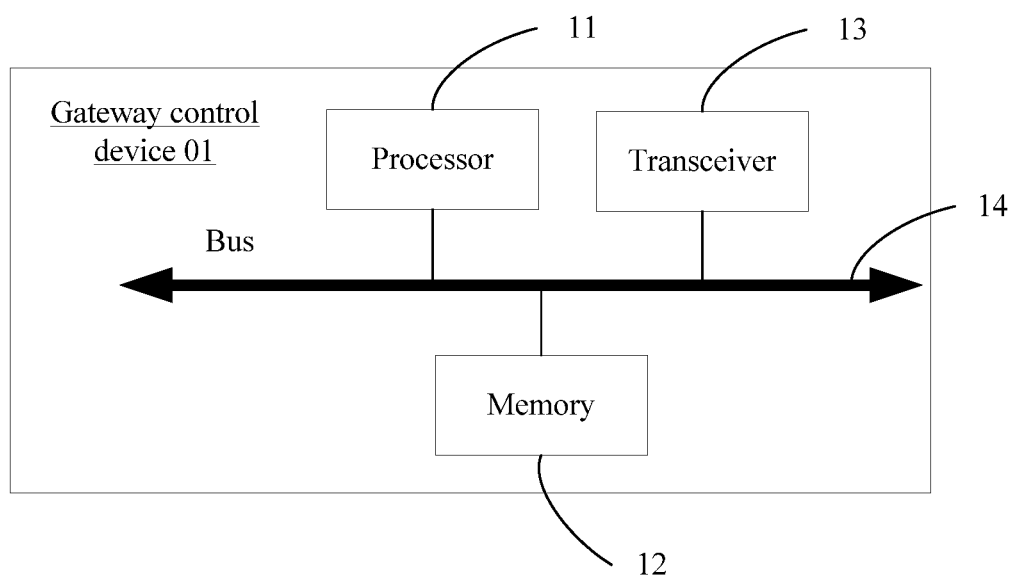
FIG. 12 is a schematic diagram of a hardware structure of a gateway control device according to an embodiment of the present disclosure.

FIG. 12 is a schematic structural diagram of a gateway control device 01 according to an embodiment of the present disclosure. The gateway control device 01 provided in this embodiment of the present disclosure may be configured to implement the methods implemented in the embodiments of the present disclosure shown in FIG. 1 to FIG. 10. For ease of description, only a part related to this embodiment of the present disclosure is shown. For specific technical details that are not disclosed, refer to the embodiments of the present disclosure shown in FIG. 1 and FIG. 10.

Specifically, as shown in FIG. 12, the gateway control device 01 includes a processor 11, a memory 12, a transceiver 13, and a bus 14. The processor 11, the transceiver 13, and the memory 12 are connected and implement mutual communication by using the bus 14.

The processor 11 is configured to search, according to packet characteristic information of a first packet, a prestored policy library for a first processing policy corresponding to the packet characteristic information.

The transceiver 13 is configured to: receive the packet characteristic information that is of the first packet and that is sent by a gateway forwarding device 02, where the packet characteristic information is obtained after the gateway forwarding device 02 performs packet inspection on the first packet; and send the first processing policy to the gateway forwarding device 02, so that the gateway forwarding device 02 executes a packet processing action in the first processing policy.

The memory 12 is configured to store the policy library. The policy library stores a correspondence between a processing policy and an execution condition of the processing policy, and each processing policy stored in the policy library includes at least one packet processing action.

Further, the packet characteristic information of the first packet includes Layer 3 and layer 4 characteristic information of the first packet of Open System Interconnection OSI model. The processor 11 is further configured to: search the policy library for at least one second processing policy corresponding to the layer 3 and layer 4 characteristic information, and determine one of the at least one second processing policy as the first processing policy.

Further, the packet characteristic information of the first packet includes Layer 3 and layer 4 characteristic information of the first packet of Open System Interconnection OSI model.

The processor 11 is further configured to search the policy library for at least one second processing policy corresponding to the layer 3 and layer 4 characteristic information.

The transceiver 13 is further configured to: if an execution condition of the second processing policy includes a matching rule for layer 7 network data, deliver a first instruction message to the gateway forwarding device 02, where the first instruction message is used to instruct the gateway forwarding device 02 to perform Layer 7 packet inspection of OSI model on a received second packet, and the second packet is a packet having same 5-tuple information as the first packet; and receive Layer 7 characteristic information of the second packet of OSI model and that is sent by the gateway forwarding device 02.

The processor 11 is further configured to determine, from the at least one second processing policy, a first processing policy corresponding to the Layer 7 characteristic information of the second packet of OSI model.

Further, the packet characteristic information of the first packet includes Layer 3, layer 4, and layer 7 characteristic information of the first packet of OSI model.

The processor 11 is further configured to: search the policy library for at least one second processing policy corresponding to the layer 3 and layer 4 characteristic information; and if an execution condition of the second processing policy includes a matching rule of the first packet for network data of OSI model, determine one of the at least one second processing policy as the first processing policy according to the layer 7 characteristic information.

Further, the transceiver 13 is further configured to: deliver a second instruction message to the gateway forwarding device 02, where the second instruction message is used to instruct the gateway forwarding device 02 to perform Layer 7 packet inspection of OSI model on a second packet, and the second packet is a packet having same 5-tuple information as the first packet; and receive Layer 7 characteristic information of the second packet of OSI model and that is sent by the gateway forwarding device 02.

The processor 11 is further configured to determine, from the at least one second processing policy, a first processing policy corresponding to the Layer 7 characteristic information of the second packet of OSI model.

Further, the transceiver 13 is further configured to send at least one third processing policy in the policy library and an execution condition of the third processing policy to the gateway forwarding device 02.

Further, the transceiver 13 is further configured to send at least one ADC processing policy to the gateway forwarding device 01.

Further, the packet characteristic information of the first packet includes OSI model layer 7 service type information of the first packet. The processor 11 is further configured to search the policy library for the first processing policy corresponding to the OSI model layer 7 service type information of the first packet.

Further, the processor 11 is further configured to orchestrate, into N object sets, a procedure in which the gateway forwarding device 02 processes the first packet. Each object set includes an atomic action set required when the gateway forwarding device 02 processes the first packet.

The transceiver 13 is further configured to send the N object sets to the gateway forwarding device 02, so that the gateway forwarding device 02 processes the first packet according to an atomic action set of each object in the N object sets.

Figure 13:
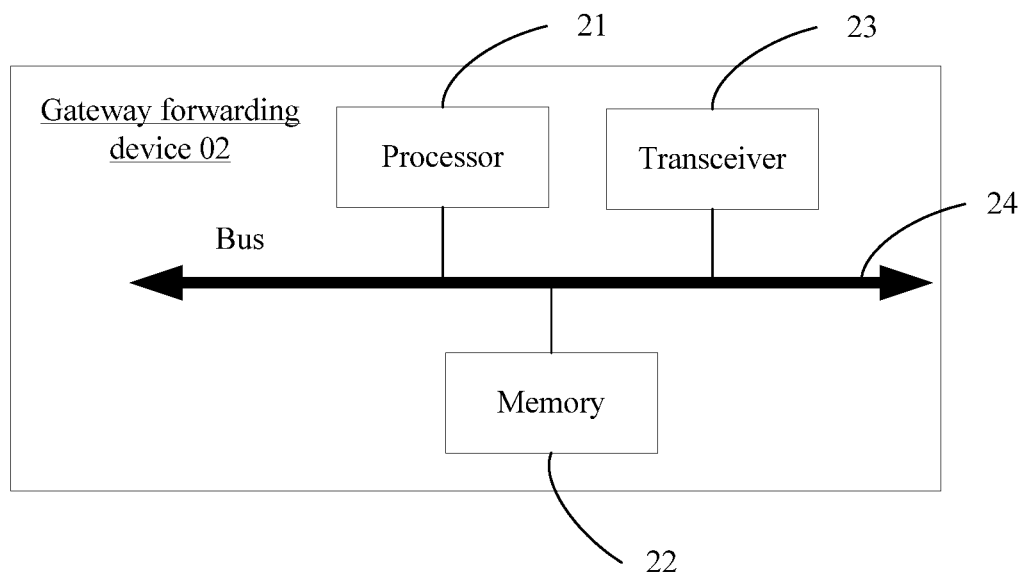
FIG. 13 is a schematic diagram of a hardware structure of a gateway forwarding device according to an embodiment of the present disclosure.

FIG. 13 is a schematic structural diagram of a gateway forwarding device 02 according to an embodiment of the present disclosure. The gateway forwarding device 02 provided in this embodiment of the present disclosure may be configured to implement the methods implemented in the embodiments of the present disclosure shown in FIG. 1 to FIG. 10. For ease of description, only a part related to this embodiment of the present disclosure is shown. For specific technical details that are not disclosed, refer to the embodiments of the present disclosure shown in FIG. 1 and FIG. 10.

Specifically, as shown in FIG. 13, the gateway forwarding device 02 includes a processor 21, a memory 22, a transceiver 23, and a bus 24. The processor 21, the transceiver 23, and the memory 22 are connected and implement mutual communication by using the bus 24.

The transceiver 23 is configured to: obtain 5-tuple information of a first packet, send packet characteristic information of the first packet to a gateway control device 01, and receive a first processing policy sent by the gateway control device 01.

The processor 21 is configured to: perform packet inspection on the first packet if the gateway forwarding device 02 stores no processing policy corresponding to the 5-tuple information, to obtain the packet characteristic information of the first packet; and execute a packet processing action in the first processing policy.

Further, the processor 21 is configured to: perform Layer 3 and layer 4 packet inspection in OSI model on the first packet, and use obtained Layer 3 and layer 4 characteristic information of the first packet of OSI model as the packet characteristic information of the first packet.

Further, the processor 21 is further configured to: if a first instruction message sent by the gateway control device 01 is received, perform Layer 7 packet inspection of OSI model on a received second packet, to obtain Layer 7 characteristic information of the second packet of OSI model. The second packet is a packet having same 5-tuple information as the first packet.

The transceiver 23 is further configured to send the layer 7 characteristic information of the second packet to the gateway control device 01.

Further, the first instruction message includes the 5-tuple information of the first packet and a quantity of inspection times of performing the layer 7 packet inspection. The processor 21 is configured to perform the layer 7 packet inspection on the second packet according to the quantity of inspection times, to obtain the Layer 7 characteristic information of the second packet of OSI model.

Further, the processor 21 is configured to: perform Layer 3, layer 4, and layer 7 packet inspection of OSI model on the first packet, and use obtained Layer 3, layer 4, and layer 7 characteristic information of the first packet of OSI model as the packet characteristic information of the first packet.

Further, the processor 21 is further configured to: if a second instruction message sent by the gateway control device 01 is received, perform Layer 7 packet inspection of OSI model on a second packet, to obtain Layer 7 characteristic information of the second packet of OSI model. The second packet is a packet having same 5-tuple information as the first packet.

The transceiver 23 is further configured to send the layer 7 characteristic information of the second packet to the gateway control device 01.

Further, the transceiver 23 is further configured to receive at least one third processing policy and an execution condition of the third processing policy that are sent by the gateway control device 01.

The processor 21 is further configured to: perform Layer 3 and layer 4 packet inspection in OSI model on the first packet, and use obtained Layer 3 and layer 4 characteristic information of the first packet of OSI model as the packet characteristic information of the first packet; and if the first processing policy corresponding to the packet characteristic information is found from the at least one third processing policy, execute the packet processing action in the first processing policy on the first packet.

Further, the transceiver 23 is further configured to receive at least one ADC processing policy sent by the gateway control device 01.

The processor 21 is further configured to: perform Layer 7 packet inspection of OSI model on the first packet, to obtain layer 7 characteristic information of the first packet of OSI model; and determine OSI model layer 7 service type information of the first packet from the at least one ADC processing policy according to the OSI model layer 7 characteristic information of the first packet, and use the service type information as the packet characteristic information of the first packet.

Further, the memory 22 is configured to save a correspondence between the first processing policy and the 5-tuple information.

The processor 21 is further configured to: if 5-tuple information that is of a third packet and that is obtained by the gateway forwarding device 02 is the same as the 5-tuple information of the first packet, execute the packet processing action in the first processing policy on the third packet.

Further, the transceiver 23 is further configured to receive N object sets sent by the gateway control device 01. Each object set includes an atomic action set required when the gateway forwarding device 02 processes the first packet.

It should be noted that the processor 11 (or the processor 21) herein may be one processor, or may be a collective term of a plurality of processing elements. For example, the processor may be a central processing unit (CPU), or may be an application-specific integrated circuit (ASIC), or may be one or more integrated circuits configured to implement this embodiment of the present disclosure, for example, one or more microprocessors (digital signal processor, DSP) or one or more field programmable gate arrays (FPGA).

The memory 22 (or the memory 12) may be a storage apparatus, or may be a collective term of a plurality of storage elements; and is configured to store executable program code, or a parameter, data, and the like that are required for running an access network management device. In addition, the memory 22 (or the memory 12) may include a random access memory (RAM), or may include a non-volatile memory such as a magnetic disk storage or a flash.

The bus 24 (or the bus 14) may be an industry standard architecture (ISA) bus, a peripheral component interconnect (PCI) bus, an extended industry standard architecture (EISA) bus, or the like. The bus may fall into an address bus, a data bus, a control bus, or the like. For ease of illustration, only one thick line is used in FIG. 12 and FIG. 13 to represent the bus. However, it does not mean that there is only one bus or only one type of bus.

At this point, according to the packet processing system and apparatus provided in the embodiments of the present disclosure, the gateway forwarding device obtains the packet characteristic information of the first packet after performing packet inspection on the received first packet, and sends the packet characteristic information to the gateway control device. The gateway control device searches, according to the packet characteristic information of the first packet, the prestored policy library for the first processing policy corresponding to the packet characteristic information, and then sends the first processing policy to the gateway forwarding device, so that the gateway forwarding device executes the packet processing action in the first processing policy on the first packet. In this way, the gateway control device is configured to implement a function of a gateway control plane, and the gateway forwarding device is configured to implement a function of a gateway forwarding plane. No gateway forwarding device needs to store a policy library. Instead, the gateway control device centrally matches different processing policies in the preset policy library for various packets. Therefore, work such as configuration, updating, and maintenance needs to be performed only on the policy library in the gateway control device, and network operation and maintenance costs are greatly reduced.

Embodiment 8

Figure 14:
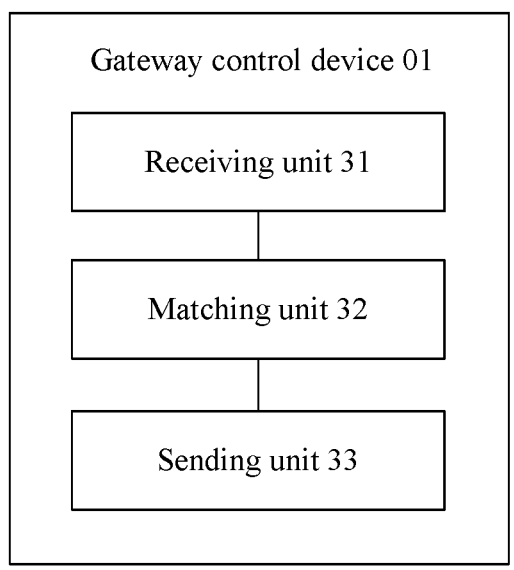
FIG. 14 is a schematic structural diagram of a gateway control device according to an embodiment of the present disclosure.

FIG. 14 is a schematic structural diagram of a gateway control device 01 according to an embodiment of the present disclosure. The gateway control device 01 provided in this embodiment of the present disclosure may be configured to implement the methods implemented in the embodiments of the present disclosure shown in FIG. 1 to FIG. 10. For ease of description, only a part related to this embodiment of the present disclosure is shown. For specific technical details that are not disclosed, refer to the embodiments of the present disclosure shown in FIG. 1 and FIG. 10.

The gateway control device 01 includes a receiving unit 31, a matching unit 32, and a sending unit 33.

The receiving unit 31 is configured to receive packet characteristic information that is of a first packet and that is sent by a gateway forwarding device. The packet characteristic information is obtained after the gateway forwarding device performs packet inspection on the first packet.

The matching unit 32 is configured to search, according to the packet characteristic information of the first packet, a prestored policy library for a first processing policy corresponding to the packet characteristic information. The policy library stores a correspondence between a processing policy and an execution condition of the processing policy, and each processing policy stored in the policy library includes at least one packet processing action.

The sending unit 33 is configured to send the first processing policy to the gateway forwarding device, so that the gateway forwarding device executes a packet processing action in the first processing policy.

Further, the packet characteristic information of the first packet includes Layer 3 and layer 4 characteristic information of the first packet of Open System Interconnection OSI model. The matching unit 32 is configured to: search the policy library for at least one second processing policy corresponding to the layer 3 and layer 4 characteristic information, and determine one of the at least one second processing policy as the first processing policy.

Alternatively, the packet characteristic information of the first packet includes Layer 3 and layer 4 characteristic information of the first packet of Open System Interconnection OSI model. The matching unit 32 is configured to search the policy library for at least one second processing policy corresponding to the layer 3 and layer 4 characteristic information. The sending unit 33 is further configured to: if an execution condition of the second processing policy includes a matching rule for layer 7 network data, deliver a first instruction message to the gateway forwarding device. The first instruction message is used to instruct the gateway forwarding device to perform Layer 7 packet inspection of OSI model on a received second packet, and the second packet is a packet having same 5-tuple information as the first packet. The matching unit 32 is further configured to: if Layer 7 characteristic information of the second packet of OSI model and that is sent by the gateway forwarding device is received, determine, by the gateway control device from the at least one second processing policy, a first processing policy corresponding to the Layer 7 characteristic information of the second packet of OSI model.

Further, the packet characteristic information of the first packet includes Layer 3, layer 4, and layer 7 characteristic information of the first packet of OSI model.

The matching unit 32 is configured to: search the policy library for at least one second processing policy corresponding to the layer 3 and layer 4 characteristic information; and if an execution condition of the second processing policy includes a matching rule of the first packet for network data of OSI model, determine one of the at least one second processing policy as the first processing policy according to the layer 7 characteristic information.

Further, the sending unit 33 is further configured to deliver a second instruction message to the gateway forwarding device. The second instruction message is used to instruct the gateway forwarding device to perform Layer 7 packet inspection of OSI model on a second packet, and the second packet is a packet having same 5-tuple information as the first packet.

The matching unit 32 is further configured to: if Layer 7 characteristic information of the second packet of OSI model and that is sent by the gateway forwarding device is received, determine, from the at least one second processing policy, a first processing policy corresponding to the Layer 7 characteristic information of the second packet of OSI model.

Further, the sending unit 33 is further configured to send at least one third processing policy in the policy library and an execution condition of the third processing policy to the gateway forwarding device.

Further, the sending unit 33 is further configured to send at least one application detection and control ADC processing policy to the gateway forwarding device.

In this case, the packet characteristic information of the first packet includes OSI model layer 7 service type information of the first packet; and the matching unit 32 is further configured to search the policy library for the first processing policy corresponding to the OSI model layer 7 service type information of the first packet.

Figure 15:
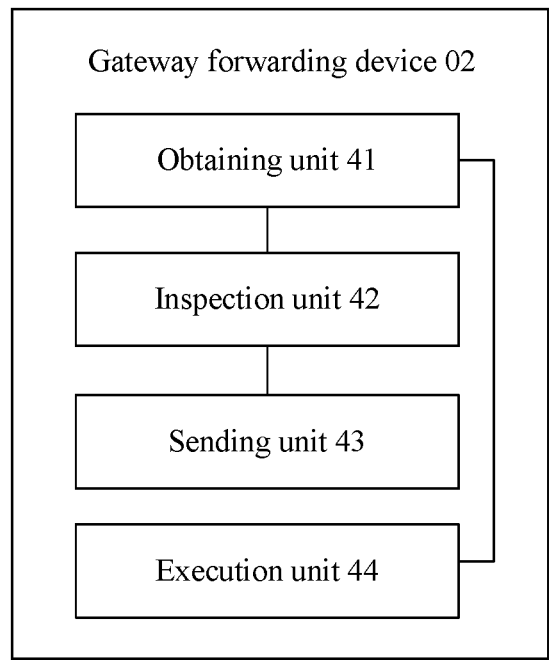
FIG. 15 is a first schematic structural diagram of a gateway forwarding device according to an embodiment of the present disclosure.

FIG. 15 is a schematic structural diagram of a gateway forwarding device 02 according to an embodiment of the present disclosure. The gateway forwarding device 02 provided in this embodiment of the present disclosure may be configured to implement the methods implemented in the embodiments of the present disclosure shown in FIG. 1 to FIG. 10. For ease of description, only a part related to this embodiment of the present disclosure is shown. For specific technical details that are not disclosed, refer to the embodiments of the present disclosure shown in FIG. 1 and FIG. 10.

The gateway forwarding device 02 includes an obtaining unit 41, an inspection unit 42, a sending unit 43, and an execution unit 44.

The obtaining unit 41 is configured to: obtain 5-tuple information of a first packet, and receive a first processing policy sent by a gateway control device.

The inspection unit 42 is configured to perform packet inspection on the first packet if the gateway forwarding device stores no processing policy corresponding to the 5-tuple information, to obtain packet characteristic information of the first packet.

The sending unit 43 is configured to send the packet characteristic information of the first packet to the gateway control device, so that the gateway control device searches a prestored policy library for the first processing policy corresponding to the packet characteristic information.

The execution unit 44 is configured to execute a packet processing action in the first processing policy.

Further, the inspection unit 42 is configured to: perform Layer 3 and layer 4 packet inspection in OSI model on the first packet, and use obtained Layer 3 and layer 4 characteristic information of the first packet of OSI model as the packet characteristic information of the first packet.

In this case, if a first instruction message sent by the gateway control device is received, the inspection unit 42 is further configured to perform Layer 7 packet inspection of OSI model on a received second packet, to obtain Layer 7 characteristic information of the second packet of OSI model. The second packet is a packet having same 5-tuple information as the first packet. Then, the sending unit 43 is configured to send the layer 7 characteristic information of the second packet to the gateway control device.

Further, the first instruction message includes the 5-tuple information of the first packet and a quantity of inspection times of performing the layer 7 packet inspection; and the inspection unit 42 is configured to perform the layer 7 packet inspection on the second packet according to the quantity of inspection times, to obtain the Layer 7 characteristic information of the second packet of OSI model.

In another implementation, the inspection unit 42 is configured to: perform Layer 3, layer 4, and layer 7 packet inspection of OSI model on the first packet, and use obtained Layer 3, layer 4, and layer 7 characteristic information of the first packet of OSI model as the packet characteristic information of the first packet.

In this case, if a second instruction message sent by the gateway control device is received, the inspection unit 42 is further configured to perform Layer 7 packet inspection of OSI model on a second packet, to obtain Layer 7 characteristic information of the second packet of OSI model. The second packet is a packet having same 5-tuple information as the first packet. Then, the sending unit 43 is configured to send the layer 7 characteristic information of the second packet to the gateway control device.

Further, the obtaining unit 41 is further configured to receive at least one third processing policy and an execution condition of the third processing policy that are sent by the gateway control device.

In this case, the inspection unit 42 is configured to: perform Layer 3 and layer 4 packet inspection in OSI model on the first packet, and use obtained Layer 3 and layer 4 characteristic information of the first packet of OSI model as the packet characteristic information of the first packet; and the execution unit 43 is configured to: if the gateway forwarding device finds, from the at least one third processing policy, the first processing policy corresponding to the packet characteristic information, execute the packet processing action in the first processing policy on the first packet.

Further, the obtaining unit 41 is further configured to receive at least one ADC processing policy sent by the gateway control device.

In this case, the inspection unit 42 is configured to: perform Layer 7 packet inspection of OSI model on the first packet, to obtain layer 7 characteristic information of the first packet of OSI model; and determine OSI model layer 7 service type information of the first packet from the at least one ADC processing policy according to the OSI model layer 7 characteristic information of the first packet, and use the service type information as the packet characteristic information of the first packet.

Figure 16:
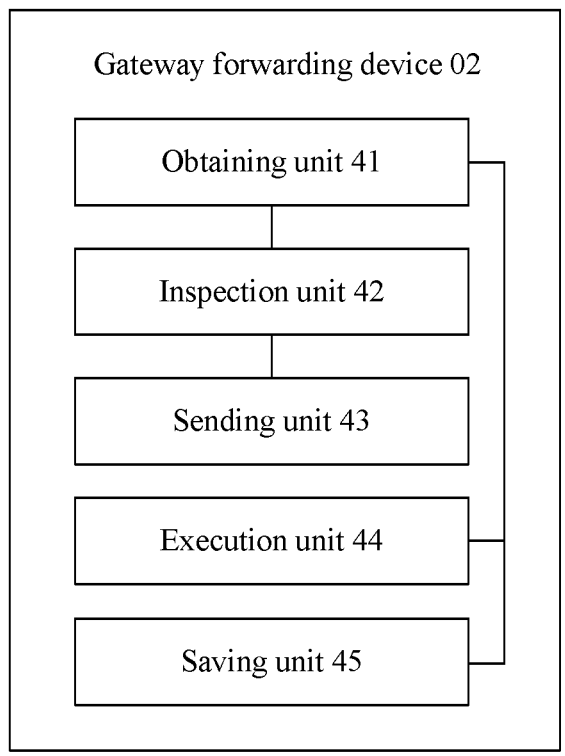
FIG. 16 is a second schematic structural diagram of a gateway forwarding device according to an embodiment of the present disclosure.

Further, as shown in FIG. 16, the gateway forwarding device 02 further includes a saving unit 45. The saving unit

45 is configured to save a correspondence between the first processing policy and the 5-tuple information.

In this case, the execution unit 44 is further configured to: if obtained 5-tuple information of a third packet is the same as the 5-tuple information that is of the first packet and that is in the saving unit 45, execute the packet processing action in the first processing policy on the third packet.

At this point, according to the packet processing apparatus provided in the embodiments of the present disclosure, the gateway forwarding device obtains the packet characteristic information of the first packet after performing packet inspection on the received first packet, and sends the packet characteristic information to the gateway control device. The gateway control device searches, according to the packet characteristic information of the first packet, the prestored policy library for the first processing policy corresponding to the packet characteristic information, and then sends the first processing policy to the gateway forwarding device, so that the gateway forwarding device executes the packet processing action in the first processing policy on the first packet. In this way, the gateway control device is configured to implement a function of a gateway control plane, and the gateway forwarding device is configured to implement a function of a gateway forwarding plane. No gateway forwarding device needs to store a policy library. Instead, the gateway control device centrally matches different processing policies in the preset policy library for various packets. Therefore, work such as configuration, updating, and maintenance needs to be performed only on the policy library in the gateway control device, and network operation and maintenance costs are greatly reduced.

It may be clearly understood by a person skilled in the art that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above. For a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are only examples. For example, the module or unit division is only logical function division and may be other division in actual implementation. For example, a plurality of units or components may be combined or integrated into another system, or some characteristics may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the conventional art, or all or some of the technical solutions may be implemented in a form of a software product. The computer software product is stored in a storage medium and includes several instructions for instructing a computer device (which may be a personal computer, a server, a network device, or the like) or a processor to perform all or some of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disc.

The foregoing descriptions are only specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A gateway control device, comprising: a processor, a memory coupled to the processor, and a transceiver, wherein:

the processor is configured to search, according to packet characteristic information of a first packet, a prestored policy library for a plurality of processing policies corresponding to the packet characteristic information and selecting a first processing policy, wherein the first processing policy has a highest priority of the plurality of processing policies;

the transceiver is configured to: receive the packet characteristic information of the first packet from a gateway forwarding device, wherein the packet characteristic information is obtained after the gateway forwarding device performs packet inspection on the first packet; and send the first processing policy to the gateway forwarding device, so that the gateway forwarding device executes a packet processing action in the first processing policy;

the memory is configured to store the prestored policy library, wherein the prestored policy library stores a correspondence between a processing policy and an execution condition of the processing policy, and each processing policy stored in the prestored policy library comprises at least one packet processing action;

the processor is further configured to orchestrate, into N object sets, a procedure in which the gateway forwarding device processes the first packet, wherein each object set comprises an atomic action set required when the gateway forwarding device processes the first packet, N is a positive integer; and the transceiver is further configured to send the N object sets to the gateway forwarding device, so that the gateway forwarding device processes the first packet according to an atomic action set of each object in the N object sets.

2. The gateway control device according to claim 1, wherein the packet characteristic information of the first packet comprises layer 3 and layer 4 characteristic information of the first packet of an Open System Interconnection (OSI) model; and
- the processor is further configured to: search the prestored policy library for at least one second processing policy corresponding to the layer 3 and layer 4 characteristic information, and determine one of the at least one second processing policy as the first processing policy.

3. The gateway control device according to claim 1, wherein the packet characteristic information of the first packet comprises: layer 3 and layer 4 characteristic information of the first packet of an Open System Interconnection (OSI) model;
- the processor is further configured to search the prestored policy library for at least one second processing policy corresponding to the layer 3 and layer 4 characteristic information;
- the transceiver is further configured to: when an execution condition of the at least one second processing policy comprises a matching rule for layer 7 network data, deliver a first instruction message to the gateway forwarding device, wherein the first instruction message is used to instruct the gateway forwarding device to perform layer 7 packet inspection of the OSI model on a received second packet, and the second packet includes same 5-tuple information as the first packet; and receive OSI model layer 7 characteristic information of the second packet of the OSI model from the gateway forwarding device; and
- the processor is further configured to determine, from the at least one second processing policy, a first processing policy corresponding to the layer 7 characteristic information of the second packet of OSI model.

4. The gateway control device according to claim 1, wherein the packet characteristic information of the first packet comprises: layer 3, layer 4, and layer 7 characteristic information of the first packet of an Open System Interconnection (OSI) model; and
- the processor is further configured to: search the policy library for at least one second processing policy corresponding to the layer 3 and layer 4 characteristic information; and when an execution condition of the second processing policy comprises a matching rule of the first packet for network data of the OSI model, determine one of the at least one second processing policy as the first processing policy according to the layer 7 characteristic information.

5. The gateway control device according to claim 4, wherein
- the transceiver is further configured to deliver a second instruction message to the gateway forwarding device, wherein the second instruction message instructs the gateway forwarding device to perform layer 7 packet inspection of the OSI model on a second packet, and the second packet includes same 5-tuple information as the first packet; and receive layer 7 characteristic information of the second packet of the OSI model and that is sent by the gateway forwarding device; and
- the processor is further configured to determine, from the at least one second processing policy, a first processing policy corresponding to the layer 7 characteristic information of the second packet of the OSI model.

6. The gateway control device according to claim 1, wherein
- the transceiver is further configured to send at least one third processing policy in the policy library and an execution condition of the third processing policy to the gateway forwarding device.

7. The gateway control device according to claim 1, wherein
- the transceiver is further configured to send at least one application detection and control (ADC) processing policy to the gateway forwarding device.

8. The gateway control device according to claim 7, wherein the packet characteristic information of the first packet comprises: OSI model layer 7 service type information of the first packet; and
- the processor is further configured to search the prestored policy library for a first processing policy corresponding to the OSI model layer 7 service type information of the first packet.

9. A non-transitory machine readable storage medium having stored thereon processor executable instructions, which when executed cause a gateway control device to:
- receive packet characteristic information of a first packet from a gateway forwarding device, wherein the packet characteristic information is obtained after the gateway forwarding device performs packet inspection on the first packet;
- search, according to the packet characteristic information of the first packet, a prestored policy library for a first processing policy corresponding to the packet characteristic information, and orchestrate, into N object sets, a procedure in which the gateway forwarding device processes the first packet, wherein each object set comprises an atomic action set required when the gateway forwarding device processes the first packet, N is a positive integer; and
- send the first processing policy to the gateway forwarding device, so that the gateway forwarding device executes a packet processing action in the first processing policy wherein the first processing policy comprises the N object sets.

10. A packet processing method, comprising:
- receiving, by a gateway control device, packet characteristic information of a first packet from a gateway forwarding device, wherein the packet characteristic information is obtained after the gateway forwarding device performs packet inspection on the first packet;
- searching, by the gateway control device according to the packet characteristic information of the first packet, a prestored policy library for a plurality of processing policies corresponding to the packet characteristic information and selecting a first processing policy, wherein the first processing policy has a highest priority of the plurality of processing policies, wherein the policy library stores a correspondence between a processing policy and an execution condition of the processing policy, and each processing policy stored in the policy library comprises at least one packet processing action;
- sending, by the gateway control device, the first processing policy to the gateway forwarding device, so that the gateway forwarding device executes a packet processing action in the first processing policy,
- wherein before the receiving, by the gateway control device, packet characteristic information of the first packet, the method further comprises:
- orchestrating, by the gateway control device into N object sets, a procedure in which the gateway forwarding device processes the first packet, wherein each object set comprises an atomic action set required when the gateway forwarding device processes the first packet; and sending, by the gateway control device, the N object sets to the gateway forwarding device, so that the gateway forwarding device processes the first packet according to an atomic action set of each object in the N object sets.

11. The method according to claim 10, wherein the packet characteristic information of the first packet comprises layer 3 and layer 4 characteristic information of the first packet in Open System Interconnection (OSI) model; and the searching, by the gateway control device according to the packet characteristic information of the first packet, comprises:

searching, by the gateway control device, the policy library for at least one second processing policy corresponding to the layer 3 and layer 4 characteristic information; and determining, by the gateway control device, one of the at least one second processing policy as the first processing policy.

12. The method according to claim 10, wherein the packet characteristic information of the first packet comprises layer 3 and layer 4 characteristic information of the first packet of Open System Interconnection (OSI) model; and the searching, by the gateway control device according to the packet characteristic information of the first packet, comprises:

searching, by the gateway control device, the policy library for at least one second processing policy corresponding to the layer 3 and layer 4 characteristic information;

when an execution condition of the second processing policy comprises a matching rule for layer 7 network data, delivering, by the gateway control device, a first instruction message to the gateway forwarding device, wherein the first instruction message instructs the gateway forwarding device to perform Layer 7 packet inspection of OSI model on a received second packet, and the second packet is a packet having same 5-tuple information as the first packet; and when receiving layer 7 characteristic information of the second packet of OSI model from the gateway forwarding device, determining, by the gateway control device from the at least one second processing policy, a first processing policy corresponding to the layer 7 characteristic information of the second packet of OSI model.

13. The method according to claim 10, wherein the packet characteristic information of the first packet comprises layer 3, layer 4, and layer 7 characteristic information of the first packet of Open System Interconnection (OSI) model; and the searching, by the gateway control device according to the packet characteristic information of the first packet, comprises:

searching, by the gateway control device, the policy library for at least one second processing policy corresponding to the layer 3 and layer 4 characteristic information; and when an execution condition of the second processing policy comprises a matching rule of the first packet for network data of OSI model, determining, by the gateway control device, one of the at least one second processing policy as the first processing policy according to the layer 7 characteristic information.

14. The method according to claim 13, wherein after the searching, by the gateway control device, the policy library for at least one second processing policy corresponding to the layer 3 and layer 4 characteristic information, the method further comprises:

delivering, by the gateway control device, a second instruction message to the gateway forwarding device, wherein the second instruction message instructs the gateway forwarding device to perform layer 7 packet inspection of OSI model on a second packet, and the second packet is a packet having same 5-tuple information as the first packet; and when receiving layer 7 characteristic information of the second packet of OSI model from the gateway forwarding device, determining, by the gateway control device from the at least one second processing policy, a first processing policy corresponding to the layer 7 characteristic information of the second packet of OSI model.

15. The method according to claim 10 wherein before the receiving, by the gateway control device, packet characteristic information of the first packet, the method further comprises:

sending, by the gateway control device, at least one third processing policy in the policy library and an execution condition of the third processing policy to the gateway forwarding device.

16. The method according to any one of claim 10, wherein before the receiving, by the gateway control device, packet characteristic information of the first packet, the method further comprises:

sending, by the gateway control device, at least one application detection and control (ADC) processing policy to the gateway forwarding device.

17. The method according to claim 16, wherein the packet characteristic information of the first packet comprises Open System Interconnection (OSI) model layer 7 service type information of the first packet; and the searching, by the gateway control device according to the packet characteristic information of the first packet, a prestored policy library comprises:

searching, by the gateway control device, the policy library for the first processing policy corresponding to the OSI model layer 7 service type information of the first packet.

* * * * *